(12) United States Patent
Umeya

(10) Patent No.: US 7,158,299 B2
(45) Date of Patent: Jan. 2, 2007

(54) PROJECTION SCREEN AND PROJECTION SYSTEM COMPRISING THE SAME

(75) Inventor: Masanori Umeya, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 277 days.

(21) Appl. No.: 10/948,796

(22) Filed: Sep. 24, 2004

(65) Prior Publication Data

US 2005/0068620 A1 Mar. 31, 2005

(30) Foreign Application Priority Data

Sep. 26, 2003 (JP) ............................. 2003-335500

(51) Int. Cl.
*G03B 21/60* (2006.01)
*G02B 5/30* (2006.01)
*G02B 5/02* (2006.01)
*G02B 13/20* (2006.01)
*G02B 27/28* (2006.01)
*G02F 1/1335* (2006.01)
*C09K 19/02* (2006.01)

(52) U.S. Cl. ................ 359/459; 359/454; 359/492; 359/452; 359/599; 359/487; 359/352; 359/465; 349/185; 349/87; 349/96; 349/176

(58) Field of Classification Search ................ 359/443, 359/454, 459, 500, 492, 452, 599, 487, 352, 359/465; 349/185, 87, 96, 176
See application file for complete search history.

(56) References Cited

U.S. PATENT DOCUMENTS 5,296,965 A * 3/1994 Uetsuki et al. ............. 359/459
5,444,570 A * 8/1995 Uetsuki et al. ............. 359/483
6,381,068 B1   4/2002 Harada et al.
2003/0214632 A1 * 11/2003 Ma et al. ...................... 353/31
2005/0190442 A1 *  9/2005 Lippey et al. ............... 359/449

FOREIGN PATENT DOCUMENTS

EP    0 648 048 A1   10/1994
JP    05-107660      4/1993
JP    02-540445     11/2002

OTHER PUBLICATIONS

"Bragg Reflection From Cholesteric Liquid Crystals," W.D. St. John, et al., Physical review E, vol. 51, No. 2, Feb. 1, 1995, pp. 1191-1198.
"Optical Properties of Diffusion-Type Cholesteric Liquid Crystalline Polymer Film," A. Shiozawa et al., Molecular and Liquid Crystals, vol. 364, 2001, pp. 464-478.

* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

A projection screen includes a cholesteric liquid crystalline, polarized-light selective reflection layer for selectively diffuse-reflecting a specific polarized-light component. The layer has, on its observation-side surface, a roughened part for controlling the direction of interfacial reflection of imaging light that is projected on the layer. Imaging light projected on the projection screen from a projector enters the layer and is diffuse-reflected inside this layer; this light is diffused as diffuse-reflected light, in directions included in an approximately constant range. On the other hand, part of the light projected on the projection screen from the projector is reflected, by interfacial reflection, from the inclined planes of the roughened part. The reflected light emerges from the layer in a direction different from the main direction in which the light diffuse-reflected from the layer emerges and returns to the observation side as light reflected by interfacial reflection.

24 Claims, 13 Drawing Sheets

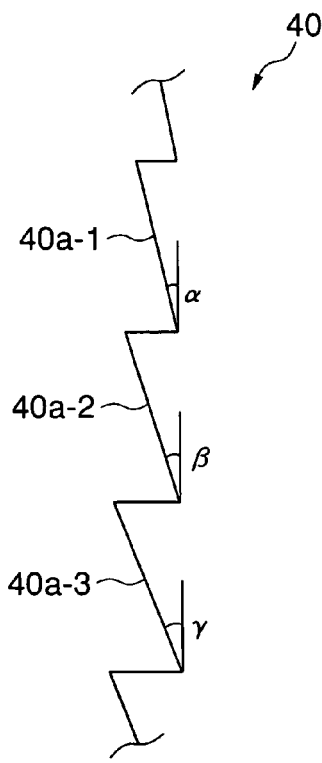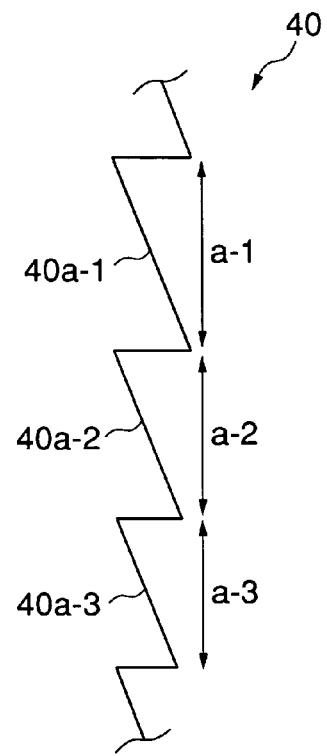
FIG. 14A　　　　FIG. 14B
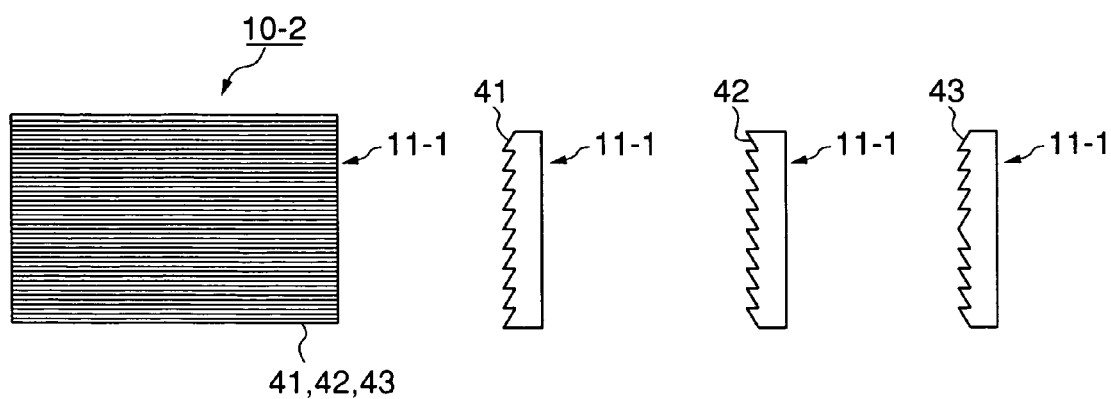
FIG. 15A　　FIG. 15B　FIG. 15C　FIG. 15D

PROJECTION SCREEN AND PROJECTION SYSTEM COMPRISING THE SAME

BACKGROUND OF THE INVENTION

1. Field of the Invention

The present invention relates to a projection system in which imaging light emitted from a projector is projected on a projection screen to display thereon an image. More particularly, the present invention relates to a projection screen capable of sharply displaying an image, not mirroring light from a light source for a projector, providing high image visibility, and to a projection system comprising such a projection screen.

2. Background Art

A conventional projection system is usually as follows: imaging light emitted from a projector is projected on a projection screen, and viewers observe the light reflected from the projection screen as an image.

Typical examples of projection screens for use in such conventional projection systems include white-colored paper or cloth materials, and plastic films coated with inks that scatter white light. Besides, high-quality projection screens that comprise scattering layers containing beads, pearlescent pigments, or the like, capable of controlling the scattering of imaging light, are now commercially available.

Since projectors have become smaller in size and moderate in price in recent years, demand for household projectors such as projectors for family theaters is growing, and an increasing number of families are now enjoying projection systems. Household projection systems are often placed in living rooms or the like, which are usually so designed that environmental light such as sunlight and light from lighting fixtures come in abundantly. Therefore, projection screens for use in household projection systems are expected to show good image display performance even under bright environmental light.

However, the above-described conventional projection screens cannot show good image display performance under bright environmental light because they reflect not only imaging light but also environmental light such as sunlight and light from lighting fixtures.

In such a conventional projection system, differences in the intensity of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

However, since the above-described conventional projection screen reflects both imaging light and environmental light such as sunlight and light from lighting fixtures without distinction, both the white- and black-indication parts get lighter, and differences in brightness between white and black become small. For this reason, the conventional projection screen cannot satisfactorily provide good image display unless the influence of environmental light such as sunlight and light from lighting fixtures on the projection screen is suppressed by using a means for shading a room, or by placing the projection screen in a dark environment.

Under these circumstances, studies have been made on projection screens capable of showing good image display performance even under bright environmental light. There have so far been proposed projection screens using, for example, holograms or polarized-light-separating layers (see Japanese Laid-Open Patent Publications No. 107660/1993 (Patent Document 1) and No. 540445/2002 (Patent Document 2)).

Of these conventional projection screens, those ones using holograms have the advantage that the white-indication part can be made lighter if their light-scattering effect is properly controlled, so that they can show relatively good image display performance even under bright environment light. However, holograms have wavelength selectivity but no polarization selectivity, so that the projection screens using holograms can display images only with limited sharpness. Moreover, because of production problems, it is difficult to produce large-sized projection screens by making use of holograms.

On the other hand, on the above-described conventional projection screens using polarized-light-separating layers, it is possible to make the white-indication part lighter and the black-indication part darker. Therefore, these projection screens can sharply display images even under bright environmental light as compared with the projection screens using holograms.

Specifically, Patent Document 1 describes a projection screen for which a cholesteric liquid crystal that reflects red, green and blue light (right- or left-handed circularly polarized light) contained in imaging light is used in order to make. The projection screen is constructed not to reflect nearly half the environmental light incident on the screen, by making use of the circularly-polarized-light-separating property of the cholesteric liquid crystal.

However, in the projection screen described in Patent Document 1, since the cholesteric liquid crystal is in the state of planar orientation, specular reflection occurs when the cholesteric liquid crystal reflects light, which makes it difficult to recognize the reflected light as an image. Namely, to recognize the reflected light as an image, it is necessary that the reflected light be scattered. However, Patent Document 1 is quite silent on this point.

On the other hand, Patent Document 2 describes a projection screen using, as a reflective polarization element, a multi-layered reflective polarizer or the like, having diffusing properties. This projection screen does not reflect part of the environmental light that is incident on it because of the polarized-light-separating property of the multi-layered reflective polarizer, and scatters the reflected light by interfacial reflection that occurs at an interface between materials having different refractive indices, constituting the multi-layered reflective polarizer, or by means of a diffusing element that is provided separately from the multi-layered reflective polarizer. Further, Patent Document 2 describes a projection screen using a cholesteric, reflective polarizer or the like as a reflective polarization element in combination with a diffusing element. This projection screen does not reflect part of the environmental light that is incident on it because of the polarized-light-separating property of the cholesteric, reflective polarizer, and scatters the reflected light by means of the diffusing element that is provided separately from the cholesteric, reflective polarizer.

Namely, the projection screen described in Patent Document 2 is made to selectively diffuse, reflect only a specific polarized-light component of the imaging light projected from a projector by making use of the so-called polarized-light-separating property so that the projection screen sharply displays an image, and is made to further scatter the reflected imaging light so that the projection screen provides improved image visibility.

However, in the projection screen described in Patent Document 2, interfacial reflection that occurs at the surface of the reflective polarization element is not taken into consideration. Therefore, for example, when reflected light produced by the interfacial reflection of imaging light (light reflected by interfacial reflection) reaches a viewer, the viewer is to observe light from a light source for the projector, mirrored in the projection screen. The projection screen thus provides decreased image visibility.

SUMMARY OF THE INVENTION

The present invention has been accomplished in the light of the above-described problems in the related art. An object of the present invention is, therefore, to provide a projection screen capable of sharply displaying an image even under bright environmental light, not mirroring light from a light source for a projector, providing high image visibility, and a projection system comprising such a projection screen.

A projection screen of the present invention, for displaying an image by reflecting imaging light that is projected from the observation side, comprises: a polarized-light selective reflection layer that selectively diffuse-reflects a specific polarized-light component, the polarized-light selective reflection layer having, on at least part of its observation-side surface thereof, a roughened part for controlling the direction of interfacial reflection of imaging light that is projected on the polarized-light selective reflection layer, wherein the surface of the roughened part of the polarized-light selective reflection layer is in a shape so determined that the imaging light reflected from the surface of the roughened part by interfacial reflection emerges in a direction different from the main direction in which the imaging light diffuse-reflected from the polarized-light selective reflection layer emerges.

In the above-described projection screen according to the present invention, it is preferable that the roughened part of the polarized-light selective reflection layer has inclined planes, the direction of the normal to the inclined planes being different from the direction of the normal to the projection screen. It is preferable that the roughened part of the polarized-light selective reflection layer has a serrate cross section or is composed of pyramidal units.

Further, in the above-described projection screen according to the present invention, it is preferable that the roughened part of the polarized-light selective reflection layer has a plurality of inclined planes disposed regularly, the direction of the normal to the inclined planes being different from the direction of the normal to the projection screen, and that the inclined planes have irregularly roughened surfaces.

Specifically, it is preferable that: the roughened part of the polarized-light selective reflection layer has a plurality of first planes, a direction of a normal to each of the first planes being different from a direction of a normal to the projection screen, and a plurality of second planes formed so as to connect each neighboring two of the first planes; the first planes comprise inclined planes that are inclined so that imaging light reflected from the first planes of the roughened part by interfacial reflection emerges in a direction different from a main direction in which the imaging light diffuse-reflected from the polarized-light selective reflection layer emerges; and the first planes have dispersion portions that disperse a direction of light that is reflected at each of the first planes, or a direction of light that emerges from each of the first planes after the light, which enters through each of the second planes, is repeatedly reflected inside the roughened part. It is preferable that the first planes of the roughened part comprise a plurality of the inclined planes having different inclined angles, or a plurality of the inclined planes having different pitches. In addition, it is preferable that the second planes have scattering portions that scatter light passing through each of the second planes.

Also, it is preferable that: the roughened part of the polarized-light selective reflection layer has a plurality of first planes, a direction of a normal to each of the first planes being different from a direction of a normal to the projection screen, and a plurality of second planes formed so as to connect each neighboring two of the first planes; the first planes comprise inclined planes that are inclined so that imaging light reflected from the first planes of the roughened part by interfacial reflection emerges in a direction different from a main direction in which the imaging light diffuse-reflected from the polarized-light selective reflection layer emerges; and the second planes have scattering portions that scatter light passing through each of the second planes.

Furthermore, in the above-described projection screen according to the present invention, it is preferable that the specific polarized-light component be right- or left-handed circularly polarized light. The specific polarized-light component may also be linearly polarized light of one vibration direction.

Furthermore, in the above-described projection screen according to the present invention, the polarized-light selective reflection layer may comprise a polarized-light selective reflection layer body that reflects the specific polarized-light component, and a diffusing element that diffuses light that is reflected from the polarized-light selective reflection layer body. The polarized-light selective reflection layer itself may have diffusing properties. In the latter case, it is preferable that the polarized-light selective reflection layer has a cholesteric liquid crystalline structure and, owing to structural non-uniformity in the cholesteric liquid crystalline structure, diffuses the specific polarized-light component. Preferably, the cholesteric liquid crystalline structure contains a plurality of helical structure parts whose helical axes extend in different directions. When the roughened part of the polarized-light selective reflection layer has inclined planes, the direction of the normal to the inclined planes being different from the direction of the normal to the projection screen, it is preferable that at least some of the helical structure parts have helical axes extending in directions that are different from the direction of the normal to the inclined planes.

Furthermore, it is preferable that the projection screen according to the present invention further comprises a substrate that supports the polarized-light selective reflection layer. In this case, the substrate may be an absorptive substrate comprising a light-absorbing layer adapted to absorb light in the visible region, or a transparent substrate adapted to transmit at least part of light in the visible region.

Furthermore, in the above-described projection screen according to the present invention, it is preferable that the polarized-light selective reflection layer comprises at least two partial selective reflection layers that are laminated to each other. In this case, it is preferable that an intermediate layer having barrier or adherent properties be provided between each neighboring two of the partial selective reflection layers.

Furthermore, it is preferable that the above-described projection screen according to the present invention further comprising a functional layer containing at least one layer selected from a group consisting of a hard coat layer, an anti-reflection layer, an ultraviolet-light-absorbing layer and an antistatic layer.

A projection system according to the present invention comprises the above-described projection screen according to the present invention; and a projector that projects imaging light on the projection screen.

According to the present invention, (1) on at least part of the observation-side surface of the polarized-light selective reflection layer for selectively diffuse-reflecting a specific polarized-light component, a roughened part for controlling the direction of interfacial reflection of imaging light that is projected on the polarized-light selective reflection layer is provided, and the shape of the surface of this roughened part is so determined that the imaging light reflected from the surface of the roughened part by interfacial reflection emerges in a direction different from the main direction in which the imaging light diffuse-reflected from the polarized-light selective reflection layer emerges. It is, therefore, possible to make the direction in which the reflected light produced by interfacial reflection that occurs at the surface of the polarized-light selective reflection layer (light reflected by interfacial reflection) emerges in directions different from the main direction in which the reflected light produced by diffuse-reflection that occurs inside the polarized-light selective reflection layer (diffuse-reflected light) emerges. For this reason, even when the imaging light projected from the observation side is reflected from the surface of the polarized-light selective reflection layer by interfacial reflection, a viewer never simultaneously observes the light reflected by interfacial reflection and the diffuse-reflected light. It is thus possible to prevent the projection screen from mirroring light from a light source for a projector, thereby improving image visibility. The main direction in which the reflected light produced by diffuse-reflection that occurs inside the polarized-light selective reflection layer (diffuse-reflected light) emerges herein means the approximately center one of the directions in which light is diffuse-reflected, and refers to the direction at which the reflection intensity peaks.

(2) If the roughened part of the polarized-light selective reflection layer has inclined planes, the direction of the normal to the inclined planes being different from the direction of the normal to the projection screen, it is possible to let the reflected light produced by interfacial reflection that occurs at the surface of the polarized-light selective reflection layer (light reflected by interfacial reflection) emerge in the direction of specular reflection, symmetrical to the direction of incidence, with respect to the normal to the inclined planes. For this reason, by controlling the direction of the normal to the inclined planes (i.e., by controlling the inclination of the inclined planes), it is possible to prevent mirroring of light from a light source for a projector that occurs when the projection screen is observed from the front (a common observation point located around the normal to the projection screen).

(3) Further, if the roughened part of the polarized-light selective reflection layer has a serrate cross section or is composed of pyramidal units, it is possible to easily prevent the reflected light produced by interfacial reflection that occurs at the surface of the polarized-light selective reflection layer (light reflected by interfacial reflection) from emerging in the same direction as that in which the reflected light produced by diffuse-reflection that occurs inside the polarized-light selective reflection layer (diffuse-reflected light) emerges, by controlling the inclination, to the normal to the projection screen, of the inclined planes in the roughened part.

(4) Furthermore, if the roughed part of the polarized-light selective reflection layer has a plurality of inclined planes disposed regularly, the direction of the normal to the inclined planes being different from the direction of the normal to the projection screen, and if these inclined planes have irregularly roughened surfaces, it is possible to eliminate the directivity of stray light that is produced by a regularly-repeating-unit structure, thereby further improving image visibility.

(5) The polarized-light selective reflection layer herein selectively reflects only a specific polarized-light component (for example, right-handed circularly polarized light if the specific polarized-light component is either right- or left-handed circularly polarized light) owing to its polarized-light-separating property. It is, therefore, possible to make the polarized-light selective reflection layer reflect only approximately 50% of unpolarized environmental light, such as sunlight and light from lighting fixtures, incident on the polarized-light selective reflection layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the one which the polarized-light selective reflection layer selectively reflects (e.g., right-handed circularly polarized light), the polarized-light selective reflection layer can reflect nearly 100% of the imaging light projected, that is, the polarized-light selective reflection layer can efficiently reflect the imaging light. Even a projector that emits linearly polarized light, such as a liquid crystal projector, can be used, regardless of the direction of linear polarization, for projecting imaging light on the projection screen, if a retardation layer or the like for converting linearly polarized light into circularly polarized light is used.

(6) The specific polarized-light component which the polarized-light selective reflection layer selectively reflects may also be a linearly polarized light of one vibration direction (P- or S-polarized light). Also in this case, the polarized-light selective reflection layer selectively reflects only a specific polarized-light component (e.g., P-polarized light) owing to its polarized-light-separating property. It is, therefore, possible to make the polarized-light selective reflection layer reflect only approximately 50% of unpolarized environmental light, such as sunlight and light from lighting fixtures, incident on the polarized-light selective reflection layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the one which the polarized-light selective reflection layer selectively reflects (e.g., P-polarized light), the polarized-light selective reflection layer can reflect nearly 100% of the imaging light projected, that is, the polarized-light selective reflection layer can efficiently reflect the imaging light. In the case where the specific polarized-light component which the polarized-light selective reflection layer selectively reflects is linearly polarized light of one vibration direction, it is possible to display a bright image by making the direction of linear polarization of light to be emitted from a projector agree with the direction of linear polarization of light which the polarized-light selective reflection layer diffuse-reflects.

(7) The polarized-light selective reflection layer may comprise a polarized-light selective reflection layer body that reflects the specific polarized-light component, and a diffusing element that diffuses light reflected from the polarized-light selective reflection layer body. In this case, since the polarized-light-separating property and diffusing properties can be made independent of each other, it is possible to easily control these two properties.

(8) Further, the polarized-light selective reflection layer itself may have diffusing properties. In this case, the state of polarization of light that is incident on the polarized-light selective reflection layer is not disturbed, so that high reflection intensity can be obtained. Specifically, when a diffusing element that cannot maintain the state of polarization of incident light is provided on the observation side of a reflective polarization element, light passes through the diffusing element before entering the reflective polarization element and the state of polarization of the light is disturbed (this is called "depolarization"). In this case, the light that passes through the diffusing element includes two types of light, environmental light (sunlight, etc.) and imaging light. When the state of polarization of environmental light is disturbed by the diffusing element, the light which the reflective polarization element inherently transmits is, owing to depolarization, converted into a light component which the reflective polarization element reflects, and is reflected from the reflective polarization element as unnecessary light. On the other hand, when the state of polarization of imaging light is disturbed by the diffusing element, the light which the reflective polarization element inherently reflects is, owing to depolarization, converted into a light component which the reflective polarization element does not reflect, and passes through the reflective polarization element. Because of these two phenomena, the original polarized-light-separating property is impaired, and image visibility cannot fully be improved. However, if the polarized-light selective reflection layer itself has diffusing properties, the above-described "depolarization" does not occur. It is, therefore, possible to improve image visibility while maintaining the polarized-light-separating property inherent in the polarized-light selective reflection layer.

(9) Preferably, the polarized-light selective reflection layer has a cholesteric liquid crystalline structure and diffuses a specific polarized-light component owing to structural non-uniformity in the cholesteric liquid crystalline structure. In this case, since environmental light and imaging light that pass through the polarized-light selective reflection layer do not undergo the above-described "depolarization", it is possible to improve image visibility while retaining the original polarized-light-separating property of the polarized-light selective reflection layer. Specifically, in the polarized-light selective reflection layer, if its cholesteric liquid crystalline structure is structurally non-uniform because, for example, the helical structure parts of the cholesteric liquid crystalline structure have helical axes extending in different directions, the polarized-light selective reflection layer reflects imaging light not by specular reflection but by diffuse reflection, and the reflected light can thus be well recognized as an image. At this time, owing to structural non-uniformity in the cholesteric liquid crystalline structure, the polarized-light selective reflection layer diffuses light that is selectively reflected. Therefore, the polarized-light selective reflection layer can reflect a specific polarized-light component while diffusing it, and, at the same time, transmit the other light components without diffusing them.

(10) If the roughened part of the polarized-light selective reflection layer has inclined planes, the direction of the normal to the inclined planes being different from the direction of the normal to the projection screen, it is preferable that at least some of the helical structure parts of the cholesteric liquid crystalline structure have helical axes extending in the directions different from the direction of the normal to the inclined planes in the roughened part. In this case, it is possible to make the direction in which the reflected light produced by interfacial reflection that occurs at the surface of the polarized-light selective reflection layer (i.e., the inclined planes in the roughened part of the polarized-light selective reflection layer) emerges in directions different from the main direction in which the diffuse-reflected light produced by diffuse-reflection that occurs inside the polarized-light selective reflection layer (i.e., the helical structure parts of the polarized-light selective reflection layer) emerges. For this reason, a viewer never simultaneously observes the light reflected by interfacial reflection and the diffuse-reflected light. It is thus possible to prevent the projection screen from mirroring light from a light source for a projector, thereby improving image visibility.

(11) Furthermore, a projection system comprising the above-described projection screen and a projector that projects imaging light on the projection screen can be herein used. In this case, it is possible to increase image contrast by suppressing the influence of environmental light such as sunlight and light from lighting fixtures by making use of the polarized-light-separating property of the polarized-light selective reflection layer in the projection screen, and, at the same time, by making use of structural non-uniformity in the cholesteric liquid crystalline structure of the polarized-light selective reflection layer, it is possible to scatter the imaging light that is reflected, without lowering image visibility. Moreover, by the roughened part provided on at least part of the observation-side surface of the polarized-light selective reflection layer, the direction of interfacial reflection of imaging light is controlled so that the imaging light that is reflected from the surface of the roughened part by interfacial reflection emerges in a direction different from the main direction in which the imaging light diffuse-reflected from the polarized-light selective reflection layer emerges. Therefore, even if the imaging light projected from the observation side is reflected from the surface of the polarized-light selective reflection layer by interfacial reflection, a viewer never simultaneously observes the reflected light produced by interfacial reflection that occurs at the surface of the polarized-light selective reflection layer (light reflected by interfacial reflection) and the reflected light produced by diffuse-reflection that occurs inside the polarized-light selective reflection layer (diffuse-reflected light). It is thus possible to prevent the projection screen from mirroring light from a light source for the projector, thereby improving image visibility.

BRIEF DESCRIPTION OF THE DRAWINGS

FIGS. 14A and 14B are diagrammatic sectional views showing modifications of the inclined planes formed on the roughened part of the polarized-light selective reflection layer in the projection screen shown in FIG. 1A;

FIGS. 15A to 15D are diagrammatic views showing projection screens according to further embodiments of the present invention;

DETAILED DESCRIPTION OF PREFERRED EMBODIMENTS

By referring to the accompanying drawings, embodiments of the present invention will be described hereinafter.

Projection Screen

First of all, a projection screen according to an embodiment of the present invention will be described with reference to FIG. 1A.

Figure 1A:
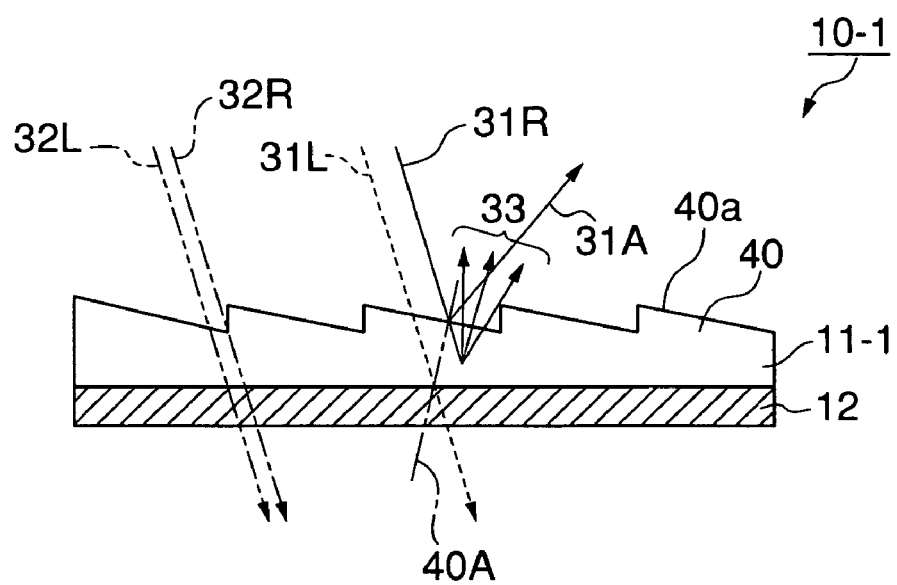
FIG. 1A is a diagrammatic sectional view showing a projection screen according to an embodiment of the present invention.

As shown in FIG. 1A, a projection screen 10-1 according to this embodiment is for displaying an image by reflecting imaging light projected from the observation side (the upper side of the figure), and comprises a cholesteric liquid crystalline, polarized-light selective reflection layer 11-1 adapted to selectively diffuse-reflect a specific polarized-light component; and a substrate 12 for supporting the polarized-light selective reflection layer 11-1. On the observation-side surface of the polarized-light selective reflection layer 11-1 is provided a roughened part 40 for controlling the direction of interfacial reflection of imaging light that is projected on the polarized-light selective reflection layer 11-1. The shape of the face of the roughened part 40 is determined so that the imaging light reflected from the surface of the roughened part 40 by interfacial reflection (light 31A reflected by interfacial reflection) emerges in a direction different from the main direction in which the imaging light diffuse-reflected from the polarized-light selective reflection layer 11-1 (diffuse-reflected light 33) emerges. More specifically, it is preferable that the roughened part 40 of the polarized-light selective reflection layer 11-1 has a plurality of inclined planes 40a, the direction of the normal to the inclined planes being different from the direction of the normal to the projection screen 10-1. Preferably, the roughened part 40 as a whole has a serrate cross section or is composed of pyramidal units, for example.

[Basic Structure of the Projection Screen]

The projection screen 10-1 according to this embodiment is characterized by having the roughened part 40 on the observation-side surface of the polarized-light selective reflection layer 11-1. This characteristic feature will be described later in detail. Now, the basic structure of the projection screen 10-1 according to this embodiment will be described, and for this purpose, the construction and actions of a projection screen 10 comprising such a polarized-light selective reflection layer 11 as is shown in FIG. 1B (a polarized-light selective reflection layer having, on its observation-side surface, no roughened part 40) will be firstly described below.

Figure 1B:
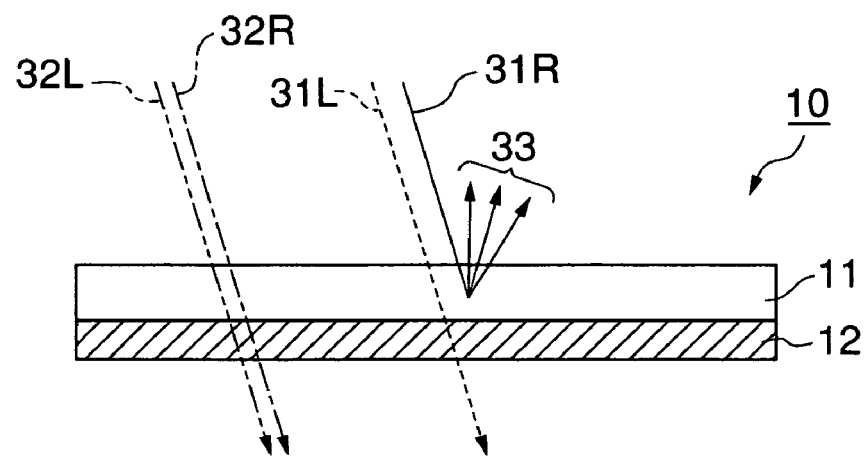
FIG. 1B is a diagrammatic sectional view showing the basic structure of a polarized-light selective reflection layer in the projection screen shown in FIG. 1A.

As shown in FIG. 1B, the polarized-light selective reflection layer 11 constituting the projection screen 10 is made from a cholesteric, liquid crystalline composition, and physically, liquid crystalline molecules in this layer are aligned in helical fashion in which the directors of the liquid crystalline molecules are continuously rotated in the direction of the thickness of the layer.

Owing to such a physical alignment of the liquid crystalline molecules, the polarized-light selective reflection layer 11 has the polarized-light-separating property, the property of separating a light component circularly polarized in one direction from a light component circularly polarized in the opposite direction. Namely, the polarized-light selective reflection layer 11 converts unpolarized light that enters the layer along the helical axis into light in two different states of polarization (right-handed circularly polarized light and left-handed circularly polarized light), and transmits one of these light and reflects the other. This phenomenon is known as circular dichroism. If the direction of rotation of liquid crystalline molecular helix is properly selected, a light component circularly polarized in the same direction as this direction of rotation is selectively reflected.

In this case, the scattering of polarized light is maximized at the wavelength $\lambda_o$ given by the following equation (1):

$$\lambda_o = nav \cdot p, \quad (1)$$

wherein p is the helical pitch in the helical structure consisting of liquid crystalline molecules (the length of one liquid crystalline molecular helix), and nav is the mean refractive index on a plane perpendicular to the helical axis.

On the other hand, the width $\Delta\lambda$ of the band in the wave range in which the wavelength of light to be reflected falls is given by the following equation (2):

$$\Delta\lambda = \Delta n \cdot p, \quad (2)$$

wherein $\Delta n$ is the value of birefringence.

Namely, as shown in FIG. 1B, of the unpolarized light that has entered the projection screen 10 from the observation side and has been split into right-handed circularly polarized light 31R and left-handed circularly polarized light 31L in the selective reflection wave range and into right-handed circularly polarized light 32R and left-handed circularly polarized light 32L not in the selective reflection wave range, one of the circularly polarized-light components in the wave range (selective reflection wave range) with the band width $\lambda\Delta$, centered at the wavelength $\lambda 0$ (e.g., right-handed circularly polarized light 31R in the selective reflection wave range) is reflected from the projection screen 10 as reflected light 33, and the other light (e.g., left-handed circularly polarized light 31L in the selective reflection wave range, and right-handed circularly polarized light 32R and left-handed circularly polarized light 32L not in the selective reflection wave range) pass through the projection screen 10, owing to the above-described polarized-light-separating property.

Figure 2A:
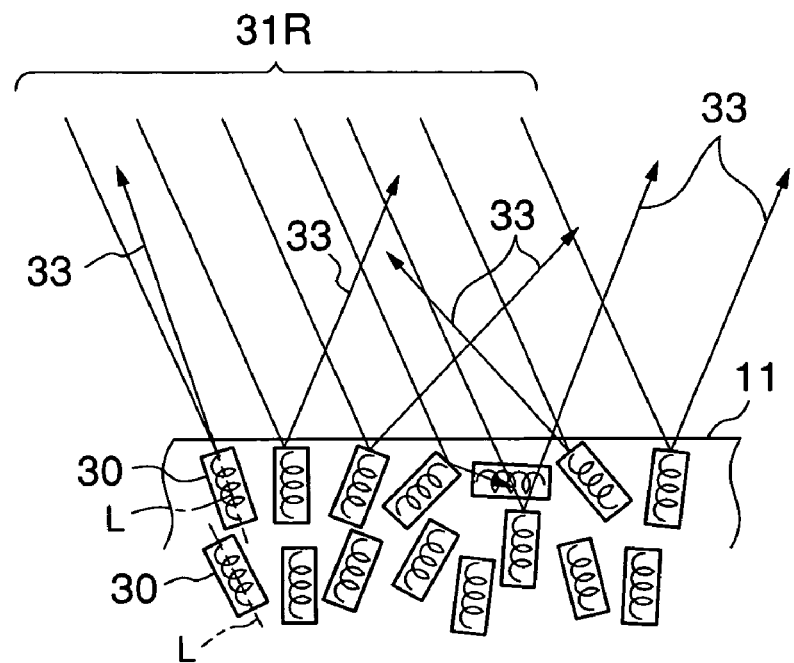
FIGS. 2A and 2B are illustrations for explaining the state of orientation of and optical function of the polarized-light selective reflection layer in the projection screen shown in FIG. 1B.

The cholesteric liquid crystalline structure of the polarized-light selective reflection layer 11 comprises a plurality of helical structure parts 30 that are different in the direction of the helical axis L, as shown in FIG. 2A. Owing to structural non-uniformity in such a cholesteric liquid crystalline structure, the polarized-light selective reflection layer 11 diffuses light that is selectively reflected (reflected light 33). The state in which the cholesteric liquid crystalline structure is structurally non-uniform herein includes: the state in which the helical structure parts 30 of the cholesteric liquid crystalline structure are different in the direction of the helical axis L; the state in which at least some of the planes of nematic layers (the planes on which the directors of liquid crystalline molecules point in the same X-Y direction) are not parallel to the plane of the polarized-light selective reflection layer 11 (the state in which, in a sectional TEM photo of a cholesteric liquid crystalline structure specimen that has been stained, continuous curves that appear as light-and-dark patterns are not parallel to the substrate plane); and the state in which finely divided particles of a cholesteric liquid crystal are dispersed in the cholesteric liquid crystalline structure as a pigment. The "diffusion" that is caused by such structural non-uniformity in the cholesteric liquid crystalline structure means that the light (imaging light) reflected from the projection screen 10 is spread or scattered to such an extent that viewers can recognize the reflected light as an image.

Figure 2B:
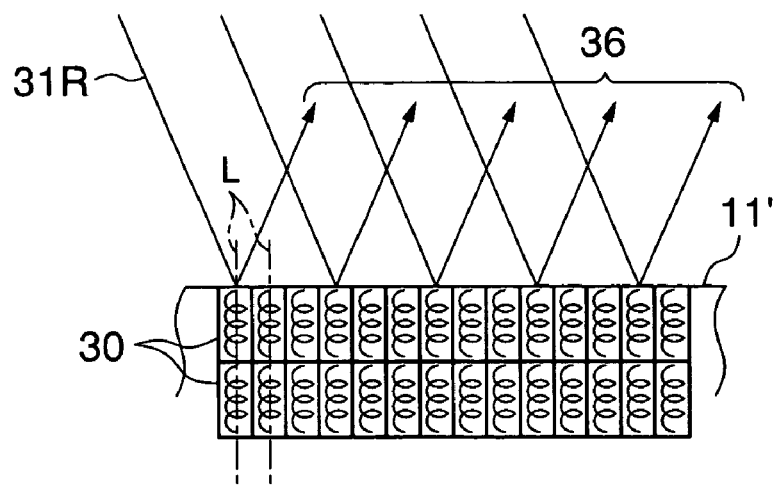

On the contrary, a conventional cholesteric liquid crystalline structure is in the state of planar orientation, and, as in a polarized-light selective reflection layer 11' shown in FIG. 2B, the helical axes L of helical structure parts 30 of the cholesteric liquid crystalline structure extend in parallel in the direction of the thickness of the layer. Such a cholesteric liquid crystalline structure selectively reflects light (reflected light 36) by specular reflection.

It is preferable that the helical structure parts 30 of the cholesteric liquid crystalline structure of the polarized-light selective reflection layer 11 has a specific helical pitch so that the polarized-light selective reflection layer 11 selectively reflects light in a specific wave range that covers only a part of the visible region (e.g., the wave range of 400 to 700 nm). More specifically, it is preferable that the cholesteric liquid crystalline structure of the polarized-light selective reflection layer 11 has at least two discontinuously different helical pitches so that the polarized-light selective reflection layer 11 selectively reflects light only in the wave range equivalent to the wave range of imaging light projected from a projector such as a liquid crystal projector (e.g., light in the specific wave range that covers only a part of the visible region). A projector usually attains color display by using light in the wave ranges of red (R), green (G) and blue (B) colors, the primary three colors. Therefore, assuming that light enters the polarized-light selective reflection layer 11 vertically to it, it is preferable to decide the helical pitches in the cholesteric liquid crystalline structure so that the polarized-light selective reflection layer 11 selectively reflects light in wave ranges centered at 430–460 nm, 540–570 nm, and 580–620 nm.

The wave ranges of 430 to 460 nm, 540 to 570 nm, and 580 to 620 nm that are used as the red (R), green (G) and blue (B) color wave ranges, respectively, are wave ranges commonly used for color filters, light sources, or the like for use in displays that produce white color by the three primary colors. Red (R), green (G) and blue (B) colors are shown as line spectra maximized at specific wavelengths (e.g., in the case of green (G) color, this wavelength is typically 550 nm). However, these line spectra have certain widths, and moreover, the projected light have wavelengths that vary depending upon the design of the projector, the type of the light source, and the like. It is, therefore, preferable that the wave range for each color has a band with a width of 30 to 40 nm. If the red (R), green (G) and blue (B) color wave ranges are set outside the above-described respective ranges, it is impossible to produce pure white, and only yellowish or reddish white is obtained.

In the case where the red (R), green (G) and blue (B) color wave ranges are given as selective reflection wave ranges that are independent of one another, it is preferable that the cholesteric liquid crystalline structure of the polarized-light selective reflection layer 11 has three helical pitches that are different discontinuously. There is a case where the red (R) and green (G) color wave ranges are included in one selective reflection wave range corresponding to one helical pitch. In this case, it is preferable that the cholesteric liquid crystalline structure of the polarized-light selective reflection layer 11 has two helical pitches that are different discontinuously.

Figure 3:
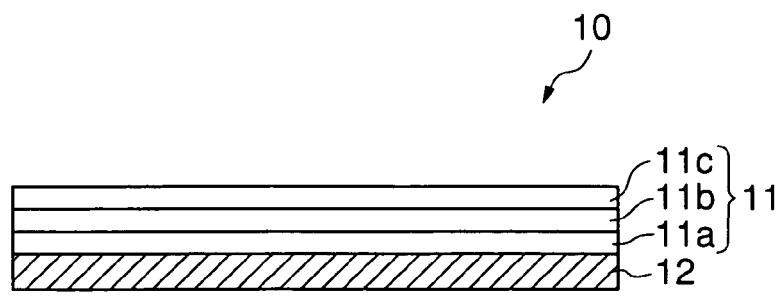
FIG. 3 is a diagrammatic sectional view showing a modification of the projection screen shown in FIG. 1B.

In the case where the cholesteric liquid crystalline structure of the polarized-light selective reflection layer 11 has two or more helical pitches that are different discontinuously, the polarized-light selective reflection layer 11 may be obtained by laminating at least two partial selective reflection layers that are different in helical pitch. Specifically, as shown in FIG. 3, a partial selective reflection layer 11a that selectively reflects light in the blue (B) color wave range, a partial selective reflection layer 11b that selectively reflects light in the green (G) color wage range, and a partial selective reflection layer 11c that selectively reflects light in the red (R) color wave range may be successively laminated from the substrate 12 side. The order in which the partial selective reflection layers 11a, 11b and 11c are laminated is not necessarily limited to the above-described one, and these partial selective reflection layers may be laminated in any order. Each one of the partial selective reflection layers 11a, 11b and 11c shown in FIG. 3 has a cholesteric liquid crystalline structure capable of selectively reflecting a specific polarized-light component (e.g., right-handed circularly polarized light) and of diffusing light that is selectively reflected, owing to structural non-uniformity in the cholesteric liquid crystalline structure, like the polarized-light selective reflection layer 11 shown in FIGS. 1B and 2A.

It is preferable that the polarized-light selective reflection layer 11 (or each partial selective reflection layer 11a, 11b, 11c constituting the polarized-light selective reflection layer 11) be made to have such a thickness that it can reflect nearly 100% of light in a specific state of polarization that is selectively reflected (such a thickness that the reflectance is saturated). This is because when the polarized-light selective reflection layer 11 has a reflectance of less than 100% for a specific polarized-light component that is selectively reflected (e.g., right-handed circularly polarized light), it cannot efficiently reflect imaging light. Although the reflectance of the polarized-light selective reflection layer 11 (or each partial selective reflection layer 11a, 11b, 11c constituting the polarized-light selective reflection layer 11) depends directly on the number of helical turns, it depends indirectly on the thickness of the polarized-light selective reflection layer 11 (or each partial selective reflection layer 11a, 11b, 11c constituting the polarized-light selective reflection layer 11) if the helical pitch is fixed. Specifically, since it is said that approximately 4 to 8 helical turns are needed to obtain a reflectance of 100%, each partial selective reflection layer 11a, 11b, 11c that reflects light in the red (R), green (G) or blue (B) color wave range is required to have a thickness of approximately 1 to 10 µm although this thickness varies depending on the type of the components of the liquid crystalline composition used for forming this layer and on the selective reflection wave range of this layer. On the other hand, the polarized-light selective reflection layer 11 (or each partial selective reflection layer 11a, 11b, 11c constituting the polarized-light selective reflection layer 11) should not be made thick limitlessly because if the layer is excessively thick, it becomes difficult to control the orientation of the layer, the layer cannot be made uniform, and the material itself for the layer absorbs light to a greater extent. For this reason, a thickness in the above-described range is proper for the polarized-light selective reflection layer 11 (or each partial selective reflection layer 11a, 11b, 11c).

Next, explanation for the substrate 12 will be given below.

The substrate 12 is for supporting the polarized-light selective reflection layer 11, and a material selected from plastic films, metals, paper, cloth, glass, and the like can be used for forming the substrate 12.

It is preferable that the substrate 12 comprises a light-absorbing layer adapted to absorb light in the visible region.

Figure 4:
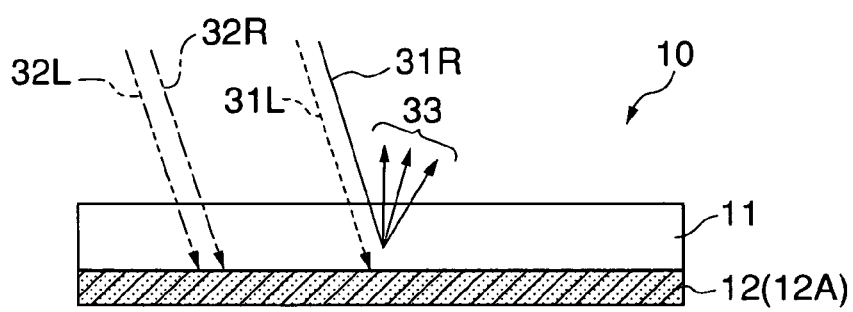
FIG. 4 is a diagrammatic sectional view showing another modification of the projection screen shown in FIG. 1B.

Specifically, for example, the substrate 12 (12A) may be made of a plastic film in which a black pigment is incorporated (e.g., a black PET film in which carbon is incorporated), as shown in FIG. 4. In this case, the substrate 12 (12A) itself serves as a light-absorbing layer (light-absorptive substrate). Such a substrate 12 absorbs those unpolarized light entering the projection screen 10 from the observation side that are inherently not reflected from the projection screen 10 as reflected light 33 (left-handed circularly polarized light 31L in the selective reflection wave range, and right-handed circularly polarized light 32R and left-handed circularly polarized light 32L not in the selective reflection wave range) and the light that enters the projection screen 10 from the backside. It is, therefore, possible to effectively prevent reflection of environmental light such as sunlight and light from lighting fixtures and production of stray light from imaging light.

Figure 5:
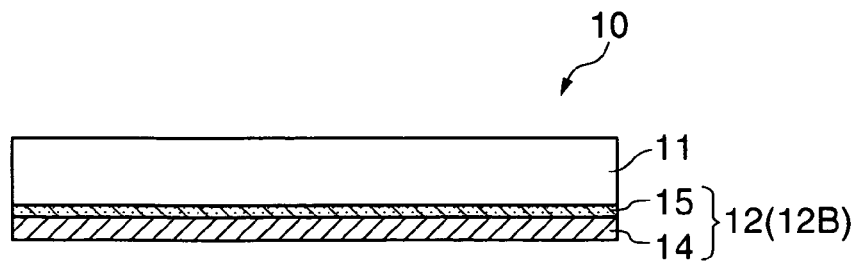
FIG. 5 is a diagrammatic sectional view showing a further modification of the projection screen shown in FIG. 1B.
Figure 6:
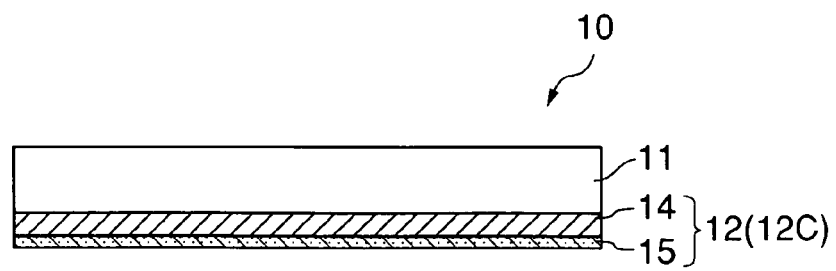
FIG. 6 is a diagrammatic sectional view showing a still further modification of the projection screen shown in FIG. 1B.

The embodiment of the substrate 12 (12A) is not limited to the one shown in FIG. 4. The substrate 12 (12B, 12C) may also be obtained in the following manner: a light-absorbing layer 15 comprising a black pigment or the like is formed on one surface of a transparent support film 14 such as a plastic film, as shown in FIGS. 5 and 6.

To make the substrate 12, windable, it is preferable to make the thickness of the substrate 12, 15 to 300 µm, more preferably 25 to 100 µm. On the other hand, when the substrate 12 is not necessarily required to have flexibility as in the case where the projection screen is used as a panel, the thickness of the substrate 12 can be made great limitlessly.

Examples of plastic films that can be used as materials for the substrate 12 or the support film 14 include films of such thermoplastic polymers as polycarbonate polymers, polyester polymers including polyethylene terephthalate, polyimide polymers, polysulfone polymers, polyether sulfone polymers, polystyrene polymers, polyolefin polymers including polyethylene and polypropylene, polyvinyl alcohol polymers, cellulose acetate polymers, polyvinyl chloride polymers, polyacrylate polymers, and polymethyl methacrylate polymers. Materials for the substrate 12 or the support film 14 are not limited to the above-described polymers, and it is also possible to use such materials as metals, paper, cloth and glass.

Lamination of the polarized-light selective reflection layer 11 to the substrate 12 is usually conducted by applying a cholesteric liquid crystalline composition and then subjecting the applied layer to aligning treatment and curing treatment, as will be described later.

In the above-described lamination process, since it is necessary to make the cholesteric liquid crystalline structure of the polarized-light selective reflection layer 11 not in the state of planar orientation, it is preferable to use, as the substrate 12, a material whose surface to which the liquid crystalline composition will be applied has no aligning power.

However, even when a material whose surface to which the liquid crystalline composition will be applied has aligning power like a stretched film is used as the substrate 12, the cholesteric liquid crystalline structure of the polarized-light selective reflection layer 11 can be made not in the state of planar orientation if this surface of the material is subjected in advance to surface treatment, or if the components of the liquid crystalline composition are properly selected, or if the conditions under which the liquid crystalline composition is oriented are controlled.

Figure 7:
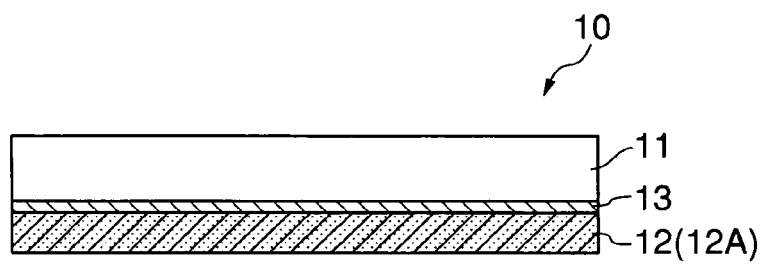
FIG. 7 is a diagrammatic sectional view showing a yet further modification of the projection screen shown in FIG. 1B.

Further, even if a material whose surface to which the liquid crystalline composition will be applied has aligning power is used as the substrate 12, it is possible to control the orientation of the cholesteric liquid crystalline structure of the polarized-light selective reflection layer 11 by providing an intermediate layer 13, such as an adherent layer, between the substrate 12 (12A) and the polarized-light selective reflection layer 11, as shown in FIG. 7, thereby directing, to a plurality of directions, the directors of liquid crystalline molecules constituting the cholesteric liquid crystalline structure of the polarized-light selective reflection layer 11, existing in the vicinity of the intermediate layer 13. By providing an intermediate layer 13 such as an adherent layer, it is also possible to improve the adhesion between the polarized-light selective reflection layer 11 and the substrate 12. For such an intermediate layer 13, any material can be used as long as it is highly adherent to both the material for the polarized-light selective reflection layer 11 and the material for the substrate 12, and it is possible to use commercially available materials. Specific examples of materials that can be used for the intermediate layer 13 include an adherent-layer-containing PET film A4100 manufactured by Toyobo Co., Ltd., Japan and adherent materials AC-X, AC-L and AC-W manufactured by Panack Co., Ltd., Japan. A black pigment or the like may be incorporated in the intermediate layer 13, thereby using the intermediate layer 13 as a light-absorbing layer adapted to absorb light in the visible region, as in the case of the substrate 12 (12A) shown in FIG. 4.

In the case where the surface of the substrate 12 has no aligning power, and the adhesion between the polarized-light selective reflection layer 11 and the substrate 12 is satisfactorily high, it is not necessarily required to provide the intermediate layer 13. To improve the adhesion between the polarized-light selective reflection layer 11 and the substrate 12, a process-related method such as corona discharge treatment or UV cleaning may also be used.

A process of producing the above-described projection screen 10 will be described hereinafter.

The substrate 12 to which the polarized-light selective reflection layer 11 will be laminated is firstly prepared. If necessary, the intermediate layer 13 such as an adherent layer is laminated to the surface of the substrate 12 on the side on which the polarized-light selective reflection layer 11 will be formed. The surface of the substrate 12 (the surface of the intermediate layer 13, if the intermediate layer 13 is present) to which a liquid crystalline composition will be applied is made to have no aligning power.

Thereafter, a cholesteric liquid crystalline composition is applied to the above-prepared substrate 12 and is then subjected to aligning treatment and curing treatment, whereby the polarized-light selective reflection layer 11 is laminated (fixed) to the substrate 12.

The steps (the steps of application, alignment and curing) for laminating (fixing) the polarized-light selective reflection layer 11 to the substrate 12 will be described in detail hereinafter.

(Step of Application)

In the step of application, a cholesteric liquid crystalline composition is applied to the substrate 12 to form thereon a cholesteric liquid crystal layer. Any of the known methods can be employed to apply the liquid crystalline composition to the substrate 12. Specifically, a roll, gravure, bar, slide, die, slit, or dip coating method can be used for this purpose. In the case where a plastic film is used as the substrate 12, a film coating method using a so-called roll-to-roll system may be used.

For the liquid crystalline composition that is applied to the substrate 12, a cholesteric, chiral nematic liquid crystal or a cholesteric liquid crystal may be used. Although any liquid crystalline material can be used as long as it can develop a cholesteric liquid crystalline structure, particularly preferable one for obtaining, after curing, an optically stable, polarized-light selective reflection layer 11 is a polymerizable liquid crystalline material having polymerizable functional groups at both ends of its molecule.

Explanation will be given below with reference to the case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material to make the resulting liquid crystalline composition cholesteric as a whole. To the liquid crystalline composition, a polymerization initiator and other proper additives are added.

Examples of polymerizable, nematic liquid crystalline materials include compounds represented by the following general formulae (1) and (2-i) to (2-xi). These compounds may be used either singly or in combination.

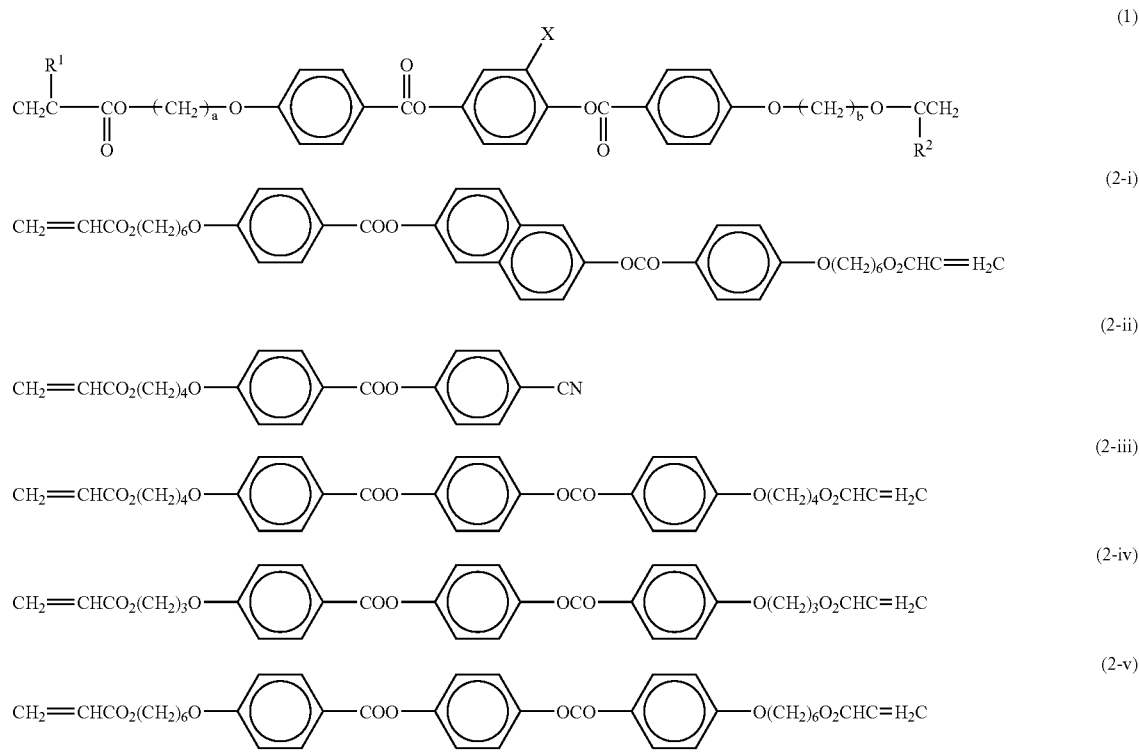

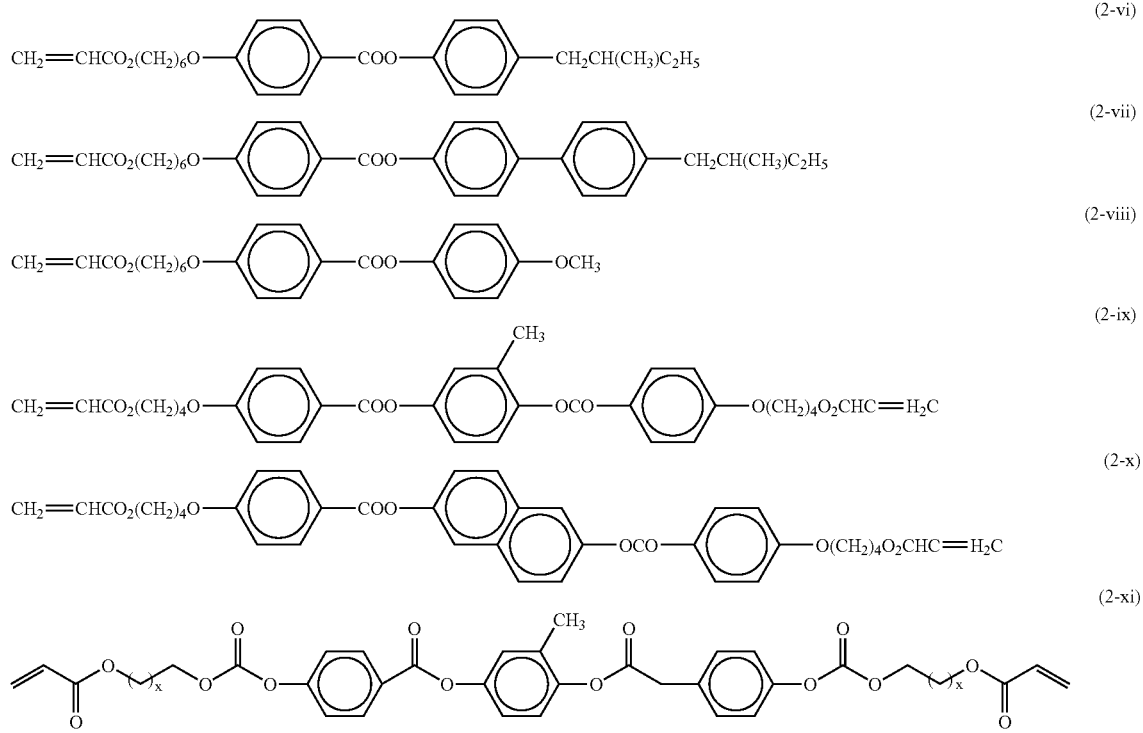

where X is an integer of 2–5

In the above general formula (1), $R^1$ and $R^2$ independently represent hydrogen or methyl group. It is, however, preferable that both $R^1$ and $R^2$ represent hydrogen because a liquid crystalline composition containing such a compound shows a liquid crystal phase at temperatures in a wider range. X is hydrogen, chlorine, bromine, iodine, an alkyl group having 1 to 4 carbon atoms, methoxy group, cyano group or nitro group, preferably chlorine or methyl group. Further, in the above general formula (1), a and b that denote the chain lengths of the alkylene groups that serve as spacers between the (meth)acryloyloxy groups on both ends of the molecule and the aromatic rings are independently an integer of 2 to 12, preferably an integer of 4 to 10, more preferably an integer of 6 to 9. Those compounds represented by the general formula (1) in which a=b=0 are unstable, easily undergo hydrolysis, and have high crystallinity. On the other hand, those compounds represented by the general formula (1) in which a and b are independently an integer of 13 or more have low isotropic transition temperatures (TI's). Since these compounds show liquid crystal phases at temperatures in narrow ranges, they are undesirable.

Although a polymerizable liquid crystal monomer is, in the above description, used as the polymerizable, nematic liquid crystalline material, it is also possible to use, as the polymerizable, nematic liquid crystal material, a polymerizable liquid crystal oligomer or polymer, a liquid crystal polymer, or the like, properly selected from conventionally proposed ones.

On the other hand, the chiral agent is a low molecular weight compound containing an optically active site, having usually a molecular weight of not more than 1,500. The chiral agent is used in order to convert the positive monoaxially-nematic structure of a polymerizable, nematic liquid crystalline material into a helical structure. Any type of low molecular weight compounds may be used as the chiral agent as long as it is compatible with the polymerizable, nematic liquid crystalline material in the state of solution or melt and can make the liquid crystalline structure helical without impairing the liquid crystallinity of the material.

The chiral agent that is used for making the structure of a liquid crystal helical is required to have any type of chirality at least in its molecule. Examples of chiral agents useful herein include those compounds having 1, or 2 or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals such as a chiral dopant liquid crystal "S-811" manufactured by Merck KGaA, Germany.

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is non-polymerizable, the liquid crystalline composition has reduced hardenability, and the cured film is poor in reliability. Moreover, the use of a large amount of a chiral agent having an optically active site boosts the cost of the liquid crystalline composition. Therefore, to form a polarized-light selective reflection layer having a cholesteric structure with a short helical pitch, it is preferable to select, as the optically-active-site-containing chiral agent to be incorporated in the liquid crystalline composition, a chiral agent whose helical-structure-developing action is great. Specifically, it is preferable to use one of the compounds represented by the following general formulae (3), (4) and (5), which are low-molecular-weight compounds whose molecules are axially chiral.

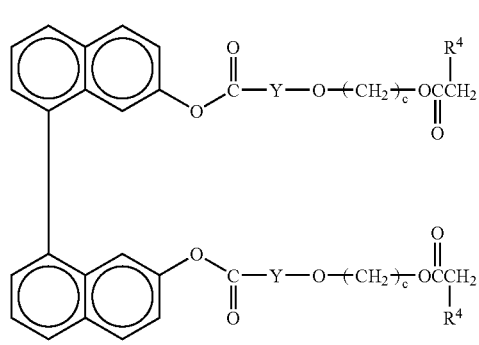
(3)
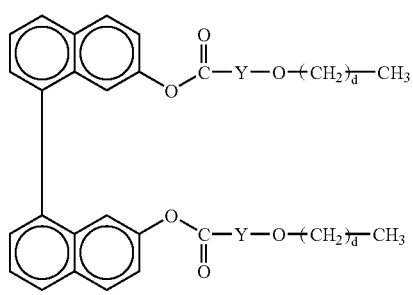
(4)
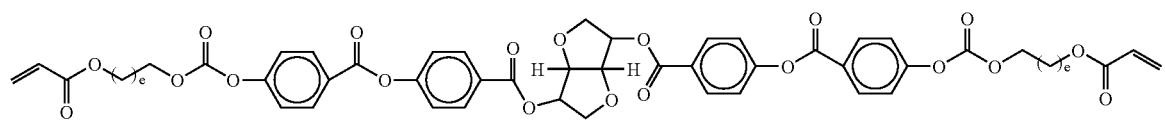
(5)
where e is an integer of 2–5
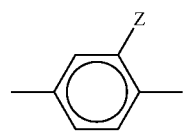
(i)
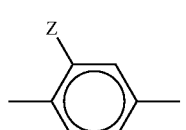
(ii)
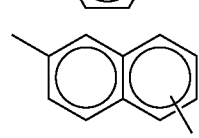
(iii)
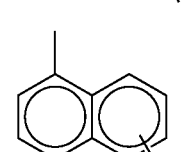
(iv)
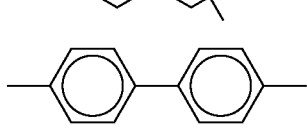
(v)
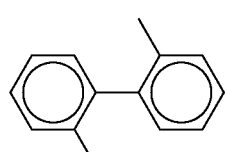
(vi)
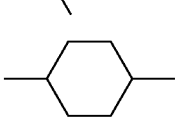
(vii)
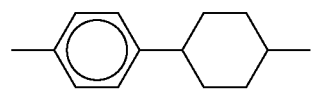
(viii)
-continued
(ix)
(x)
(xi)
(xii)
(xiii)
(xiv)
(xv)
(xvi)
(xvii)

-continued

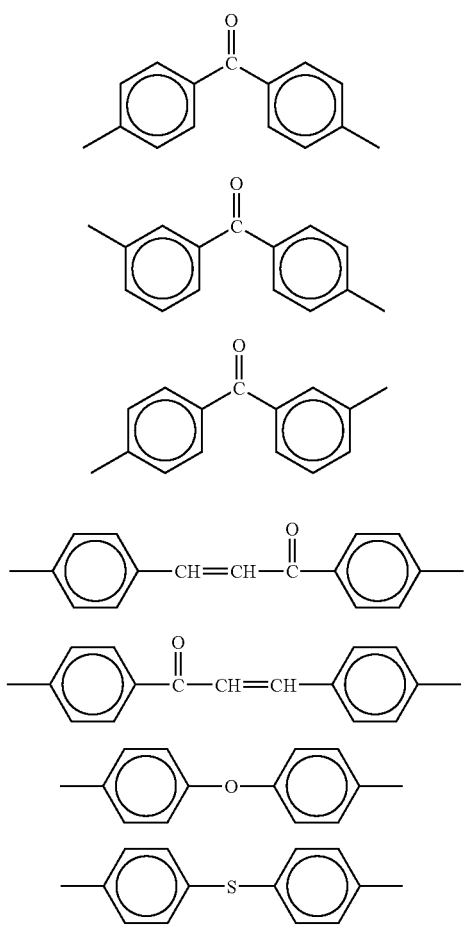

In the above general formulae (3) and (4), $R^4$ represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Those compounds represented by the above general formula (3) or (4) in which c or d is 0 or 1 are poor in stability, easily undergo hydrolysis, and have high crystallinity. On the other hand, those compounds represented by the general formula (3) or (4) in which c or d is 13 or more have low melting points (Tm's). These compounds are less compatible with the polymerizable, nematic liquid crystalline material, so that a liquid crystalline composition containing such a compound as the chiral agent may cause phase separation depending on the concentration of the compound.

The chiral agent is not necessarily polymerizable. However, if the chiral agent is polymerizable, it is polymerized with the polymerizable, nematic liquid crystalline material to give a stably fixed cholesteric structure. Therefore, from the viewpoint of thermal stability and the like, it is desirable that the chiral agent be polymerizable. In particular, the use of a chiral agent having polymerizable functional groups at both ends of its molecule is preferable to obtain a polarized-light selective reflection layer 11 excellent in heat resistance.

The content of the chiral agent in the liquid crystalline composition is optimally decided in consideration of the helical-structure-developing ability of the chiral agent, the cholesteric liquid crystalline structure of the resulting polarized-light selective reflection layer 11, and so forth. Although the amount of the chiral agent to be added greatly varies depending upon the components of the liquid crystalline composition, it is from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. In the case where the amount of the chiral agent added is smaller than this range, there is a possibility that the liquid crystalline composition cannot fully become cholesteric. On the other hand, when the amount of the chiral agent added exceeds the above-described range, the alignment of liquid crystalline molecules is impeded, which may adversely affect the liquid crystalline composition in the course of curing using activating radiation or the like.

Although the liquid crystalline composition can be applied as it is to the substrate 12, it may be dissolved in a suitable solvent such as an organic solvent to give an ink in order to make the viscosity of the liquid crystalline composition fit for an applicator or to attain excellent alignment of liquid crystalline molecules.

Although any solvent can be used for the above purpose as long as it can dissolve the above-described polymerizable liquid crystalline material, it is preferable that the solvent does not attack the substrate 12. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted to any degree. However, considering that a liquid crystal itself is a material having low solubility and high viscosity, it is preferable to dilute the polymerizable liquid crystalline material to such a degree that the content of the liquid crystalline material in the diluted solution is in the order of preferably 5 to 50%, more preferably 10 to 30%.

(Step of Alignment)

After applying the liquid crystalline composition to the substrate 12 to form thereon a cholesteric liquid crystal layer in the above-described step of application, the cholesteric liquid crystal layer is, in the step of alignment, held at a predetermined temperature at which the cholesteric liquid crystal layer develops a cholesteric liquid crystalline structure, thereby aligning liquid crystalline molecules in the cholesteric liquid crystal layer.

The cholesteric liquid crystalline structure of the polarized-light selective reflection layer 11 that should be finally obtained is one not in such a state of planar orientation as is shown in FIG. 2B but in such a state of orientation as is shown in FIG. 2A, in which a plurality of the helical structure parts 30 that are different in the direction of the helical axis L are present. Even so, it is necessary to conduct alignment treatment. Namely, although it is not necessary to align, in one direction on the substrate 12, the directors of liquid crystalline molecules in the cholesteric liquid crystalline structure, it is necessary to conduct such alignment treatment that a plurality of the helical-structure parts 30 are produced in the cholesteric liquid crystalline structure.

When the cholesteric liquid crystal layer formed on the substrate 12 is held at a predetermined temperature at which the cholesteric liquid crystal layer develops a cholesteric liquid crystalline structure, it shows a liquid crystal phase. At this time, owing to the self-accumulating action of liquid crystalline molecules themselves, continuous rotation of the directors of the liquid crystalline molecules occurs in the direction of the thickness of the layer, and a helical structure is produced. It is possible to fix this cholesteric liquid crystalline structure in a liquid crystal phase state by curing the cholesteric liquid crystal layer using such a technique as will be described later.

In the case where the liquid crystalline composition applied to the substrate 12 contains a solvent, the step of alignment is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time (heating time) is preferably from 15 to 600 seconds, more preferably from 30 to 180 seconds. After once conducting the drying treatment, if it is realized that the liquid crystal layer is not fully orientated, this layer may be further heated accordingly. In the case where this drying treatment is conducted by means of vacuum drying, it is preferable to separately conduct heat treatment in order to align liquid crystalline molecules.

(Step of Curing)

After aligning liquid crystalline molecules in the cholesteric liquid crystal layer in the above-described step of alignment, the cholesteric liquid crystal layer is cured in the step of curing, thereby fixing the cholesteric liquid crystalline structure that is in the liquid crystal phase state.

To effect the step of curing, it is possible to use: (1) a method in which the solvent contained in the liquid crystalline composition is evaporated; (2) a method in which liquid crystalline molecules in the liquid crystalline composition are thermally polymerized; (3) a method in which liquid crystalline molecules in the liquid crystalline composition are polymerized by the application of radiation; or (4) any combination of these methods.

Of the above methods, the method (1) is suitable for the case where a liquid crystal polymer is used as the polymerizable, nematic liquid crystalline material that is incorporated in the liquid crystalline composition for forming the cholesteric liquid crystal layer. In this method, the liquid crystal polymer is dissolved in such a solvent as an organic solvent, and this solution is applied to the substrate 12. In this case, a solidified, cholesteric liquid crystal layer can be obtained by simply removing the solvent by drying. The type of the solvent, the drying conditions, and so on are the same as those ones that are used in the aforementioned steps of application and alignment.

The above-described method (2) is for curing the cholesteric liquid crystal layer by thermally polymerizing liquid crystalline molecules in the liquid crystalline composition by heating. In this method, the state of bonding of the liquid crystalline molecules varies according to heating (baking) temperature. Therefore, if the cholesteric liquid crystal layer is heated non-uniformly, the cured layer cannot be uniform in physical properties such as film hardness and in optical properties. In order to limit variations in film hardness to ±10%, it is preferable to control the heating temperature so that it varies only within ±5%, preferably ±2%.

Any method may be employed to heat the cholesteric liquid crystal layer formed on the substrate 12 as long as it can provide uniformity in heating temperature. The liquid crystal layer may be placed directly on a hot plate and held as it is, or placed indirectly on a hot plate with a thin air layer interposed between the liquid crystal layer and the hot plate and held parallel with the hot plate. Besides, a method using a heater capable of entirely heating a particular space, such as an oven, may be employed. In this case, the liquid crystal layer is placed in or passed through such a heater. If a film coater or the like is used, it is preferable to make the drying zone long enough to make the heating time sufficiently long.

The heating temperature required is usually as high as 100° C. or more. However, considering the heat resistance of the substrate 12, it is preferable to limit this temperature to below approximately 150° C. If a specialized film or the like having significantly high heat resistance is used as the substrate 12, the heating temperature can be made as high as above 150° C.

The above-described method (3) is for curing the cholesteric liquid crystal layer by photo-polymerizing liquid crystalline molecules in the liquid crystalline composition by the application of radiation. In this method, electron beams, ultraviolet rays, or the like suitable for the conditions can be used as the radiation. In general, ultraviolet light is preferred because of the simplicity of ultraviolet light irradiation systems, and so forth. The wavelength of ultraviolet light useful herein is from 250 to 400 nm. If ultraviolet light is used, it is preferable to incorporate a photopolymerization initiator in the liquid crystalline composition in advance.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-choloro-4-propoxythioxanthone. In addition to photopolymerization initiators, sensitizers may be added to the liquid crystalline composition unless they hinder the attainment of the object of the present invention.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

By effecting a series of the above-described steps (steps of application, alignment and curing), it is possible to obtain a projection screen 10 comprising a polarized-light selective reflection layer 11 composed of a single cholesteric liquid crystal layer. It is also possible to obtain a projection screen 10 comprising a polarized-light selective reflection layer 11 composed of a plurality of cholesteric liquid crystal layers by repeatedly conducting a series of the above-described steps. By repeatedly conducting these steps, it becomes possible to obtain, for example, such a projection screen 10 as is shown in FIG. 3, comprising, as the polarized-light selective reflection layer 11, a partial selective reflection layer 11a that selectively reflects light in the blue (B) color wave range, a partial selective reflection layer 11b that selectively reflects light in the green (G) color wave range, and a partial selective reflection layer 11c that selectively reflects light in the red (R) color wage range, which are successively laminated in this order to the substrate 12.

In this case, as long as the underlying cholesteric liquid crystal layer has been solidified, a liquid crystalline composition for forming the second or later cholesteric liquid crystal layer can be applied by using the same technique as in the formation of the first liquid crystal layer. In this case, continuity is produced between the cholesteric liquid crystalline structure (the state of orientation) of the upper cholesteric liquid crystal layer and that of the lower cholesteric liquid crystal layer. It is, therefore, unnecessary to provide an alignment-controlling layer or the like between these two cholesteric liquid crystal layers. However, an intermediate layer such as an adherent layer (see reference numeral 13 in FIG. 8) may be provided between these two cholesteric liquid crystal layers, as needed. In the formation of the second and later cholesteric liquid crystal layers, the conditions under which the steps of application, alignment and curing are conducted and the materials that are used for forming the cholesteric liquid crystal layers are as mentioned above, so that explanation for them is herein omitted.

Thus, the projection screen 10 comprises the polarized-light selective reflection layer 11 having a cholesteric liquid crystalline structure, adapted to selectively reflect a specific polarized-light component, and, owing to structural non-uniformity in the cholesteric liquid crystalline structure that is brought about, for example, by the helical structure parts 30 whose helical axes L extend in different direction, it diffuses light that is selectively reflected.

The polarized-light selective reflection layer 11 selectively reflects only a specific polarized-light component (e.g., right-handed circularly polarized light) owing to the polarized-light-separating property of the cholesteric liquid crystalline structure, so that the polarized-light selective reflection layer 11 can be made to reflect only approximately 50% of the unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer 11 selectively reflects (e.g., right-handed circularly polarized light), the polarized-light selective reflection layer 11 can reflect nearly 100% of the imaging light projected, that is, the polarized-light selective reflection layer 11 can efficiently reflect the imaging light.

Furthermore, since the polarized-light selective reflection layer 11 has a structurally non-uniform, cholesteric liquid crystalline structure in which the helical structure parts 30 have helical axes L extending in different directions, this layer 11 reflects imaging light not by specular reflection but by diffuse reflection, and the reflected light can thus be well recognized as an image. At this time, owing to structural non-uniformity in the cholesteric liquid crystalline structure, the polarized-light selective reflection layer 11 diffuses light that is selectively reflected, so that it can reflect a specific polarized-light component (e.g., right-handed circularly polarized light 31R in the selective reflection wave range) while diffusing it, and, at the same time, transmits the other light components (e.g., left-handed circularly polarized light 31L in the selective reflection wave range, and right-handed circularly polarized light 32R and left-handed circularly polarized light 32L not in the selective reflection wave range) without diffusing them. For this reason, the environmental light and imaging light that pass through the polarized-light selective reflection layer 11 do not undergo the previously-mentioned "depolarization", and it is thus possible to improve image visibility while maintaining the polarized-light-separating property inherent in the polarized-light selective reflection layer 11.

Thus, according to the above-described projection screen 10, it is possible to increase image contrast by suppressing the influence of environmental light such as sunlight and light from lighting fixtures by making use of the polarized-light-separating property of the cholesteric liquid crystal structure, and, at the same time, by making use of structural non-uniformity in the cholesteric liquid crystalline structure, it is possible to diffuse the imaging light that is reflected, without lowering image visibility. The projection screen 10 can, therefore, sharply display an image even under bright environmental light.

Further, according to the above-described projection screen 10, the polarized-light selective reflection layer 11 is made to selectively reflect light in a specific wave range that covers only a part of the visible region. It is, therefore, possible to further suppress the influence of environmental light such as sunlight and light from lighting fixtures to increase the image contrast, thereby further improving the image visibility.

[Detailed Structure of the Projection Screen]

The projection screen 10-1 according to this embodiment whose basic structure is the same as that of the above-described projection screen 10 will be described in detail hereinafter with reference to FIGS. 1A and 9. The projection screen 10-1 and the polarized-light selective reflection layer 11-1 constituting it are almost the same as the aforementioned projection screen 10 and polarized-light selective reflection layer 11 constituting it, respectively, except that the polarized-light selective reflection layer 11-1 has, on its observation-side surface, a roughened part 40. Explanation for the constitution and functions of those components of the projection screen 10-1 shown in FIGS. 1A and 9 that are identical with those of the projection screen 10 are herein omitted.

Figure 9:
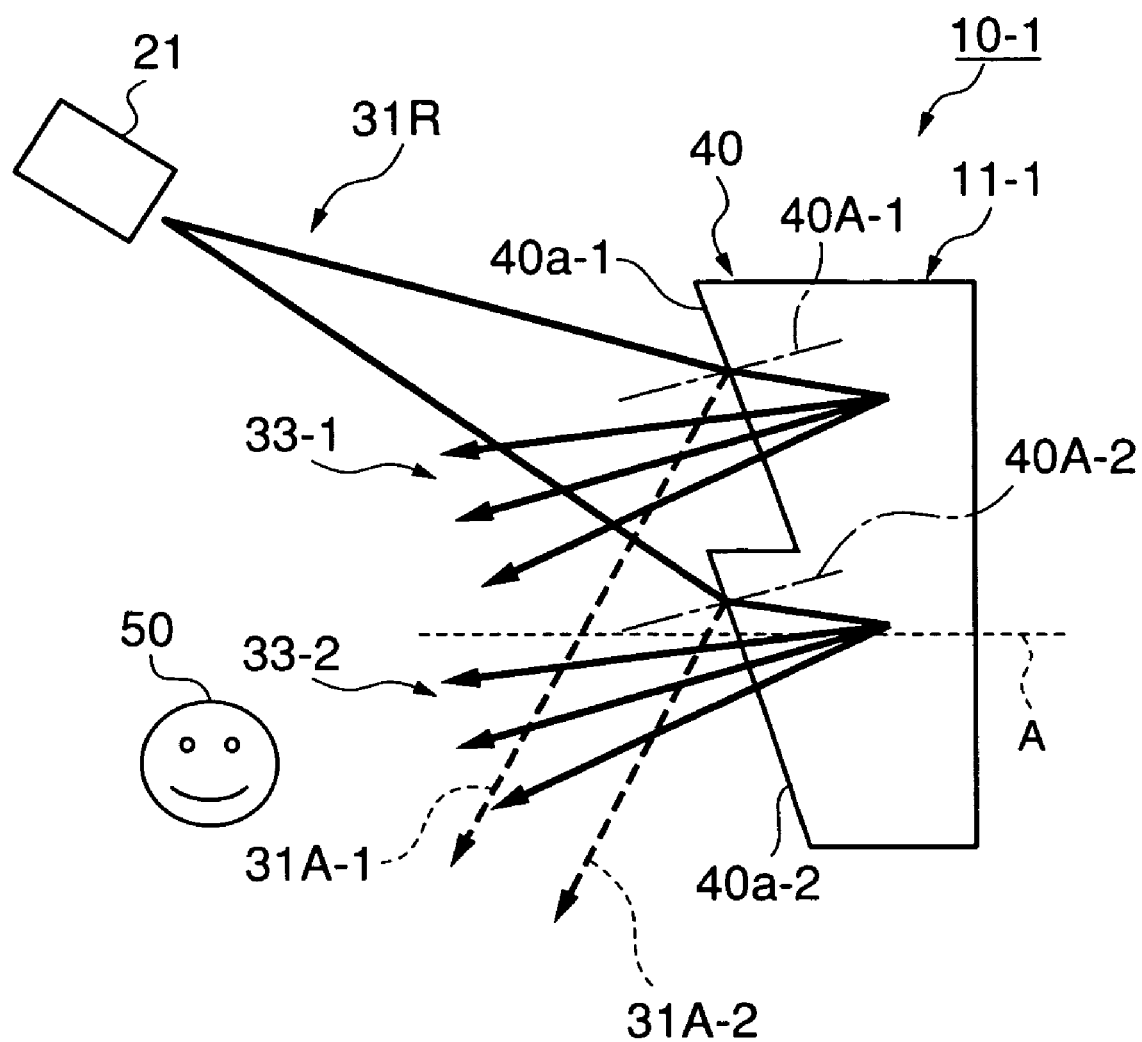
FIG. 9 is an illustration for explaining the concept of image display in a projection system using the projection screen shown in FIG. 1A.

As shown in FIGS. 1A and 9, in the projection screen 10-1 according to this embodiment, a roughened part 40 for controlling the direction of interfacial reflection of imaging light that is projected on the polarized-light selective reflection layer 11-1 is provided on the observation-side surface of the polarized-light selective reflection layer 11-1. More specifically, as shown in FIG. 9 the roughened part 40 has a plurality of inclined planes 40a-1, 40a-2, the direction of the normal 40A-1, 40A-2 to the inclined planes 40a-1, 40a-2 being different from the direction of the normal A to the projection screen 10-1, and, as a whole, has a serrate cross section extending in one predetermined direction. Since the direction of the normal 40A-1, 40A-2 to the inclined planes 40a-1, 40a-2 in the roughened part 40 is different from the direction of the normal A to the projection screen 10-1, the inclined planes 40a-1, 40a-2 in the roughened part 40 are in the state of being inclined relative to the projection screen 10-1.

The optical function of the projection screen 10-1 comprising the polarized-light selective reflection layer 11-1 that has, on its observation-side surface, the roughened part 40 will be described below with reference to FIG. 9, wherein imaging light is projected on the projection screen 10-1 from a projector 21 that is placed in the manner shown in FIG. 9. The projector 21 is placed on the observation side of the projection screen 10-1 (on the side from which a viewer 50 makes observation) and projects, as imaging light, right-handed circularly polarized light 31R in the selective reflection wave range on the polarized-light selective reflection layer 11-1 in the projection screen 10-1. The polarized-light selective reflection layer 11-1 in the projection screen 10-1 reflects right-handed circularly polarized light 31R in the selective reflection wave range.

In the projection screen 10-1, imaging light (right-handed circularly polarized light 31R in the selective reflection wave range) projected from the projector 21 enters the polarized-light selective reflection layer 11-1 and, owing to the scattering property of this layer 11-1 (the property of diffusing light that is selectively reflected, owing to structural non-uniformity in the cholesteric liquid crystalline structure containing a plurality of helical structure parts 30 whose helical axes L extend in different directions), the incident light is diffuse-reflected inside the polarized-light selective reflection layer 11-1 and is diffused as diffused-reflected light 33-1, 33-2 in directions included in an approximately constant range.

On the other hand, part of the right-handed circularly polarized light 31R projected on the projection screen 10-1 from the projector 21 is reflected, by interfacial reflection (specular reflection in this case), from the roughened part 40 provided on the observation-side surface of the polarized-light selective reflection layer 11-1 and returns to the observation side as light 31A-1, 31A-2 reflected by interfacial reflection. More specifically, the roughened part 40 has the inclined planes 40a-1, 40a-2, and these inclined planes 40a-1, 40a-2 reflect part of the right-handed circularly polarized light 31R by specular reflection, in a direction symmetrical to the direction in which the light has been projected, with respect to the normal 40A-1, 40A-2 to the inclined planes 40a-1, 40a-2. Thus, the light 31A-1, 31A-2 reflected by interfacial reflection is obtained. It is herein possible to control the direction of the light 31A-1, 31A-2 reflected by interfacial reflection, by controlling, for example, the direction of the normal 40A-1, 40A-2 to the inclined plane 40a-1, 40a-2 by varying the inclination of the inclined plane 40a-1, 40a-2.

For this reason, in the projection screen 10-1, if the shape of the face of the roughened part 40 (the inclination of the inclined plane 40a-1, 40a-2, etc.) is so determined that the reflected light 31A-1, 31A-2 produced by interfacial reflection that occurs at the inclined plane 40a-1, 40a-2 in the roughened part 40 emerges in a direction different from the main direction in which the light 33-1, 33-2 diffuse-reflected from the polarized-light selective reflection layer 11-1 emerges, a viewer 50 never simultaneously observes the light 31A-1, 31A-2 reflected by interfacial reflection and the diffuse-reflected light 33-1, 33-2 even when the imaging light projected from the observation side undergoes interfacial reflection at the surface of the polarized-light selective reflection layer 11-1. It is thus possible to prevent the projection screen 10-1 from mirroring the light from the light source for the projector 21, thereby improving image visibility. The main direction in which the light 33-1, 33-2 diffuse-reflected from the polarized-light selective reflection layer 11-1 emerges herein means the approximately center one of the directions in which the imaging light is diffuse-reflected to be the diffuse-reflected light 33-1, 33-2, and refers to the direction at which the reflection intensity peaks, for example.

The above embodiment is described by referring to the case where the directions of the normal 40A-1, 40A-2 to the inclined planes 40a-1, 40a-2 in the roughened part 40 are the same, as shown in FIG. 9. However, the directions of the normal 40A-1, 40A-2 to the inclined planes 40a-1, 40a-2 in the roughened part 40 are not necessarily the same as long as it is avoidable that a viewer simultaneously observes the light 31A-1, 31A-2 reflected by interfacial reflection and the diffuse-reflected light 33-1, 33-2.

The relationship between the helical structure parts 30 and roughened part 40 of the polarized-light selective reflection layer 11-1 in the projection screen 10-1 will be described with reference to FIGS. 10A and 10B.

In the projection screen 10-1 shown in FIG. 9, the cholesteric liquid crystalline structure of the polarized-light selective reflection layer 11-1 contains a plurality of helical structure parts 30 whose helical axes L extend in different directions, as shown in FIG. 2A. Owing to structural non-uniformity in such a cholesteric liquid crystalline structure, the polarized-light selective reflection layer 11-1 diffuses light that is selectively reflected (right-handed circularly polarized light 31R in the selective reflection wave range, in this case).

The relative relationship between the direction in which the right-handed circularly polarized light 31R reflected by interfacial reflection emerges and the main direction in which the right-handed circularly polarized light 31R diffuse-reflected emerges is determined by the relative relationship between the direction of the helical axis L of the helical structure part 30 and the direction of the normal 40A-1, 40A-2 to the inclined plane 40a-1, 40a-2 in the roughened part 40.

Figure 10A:
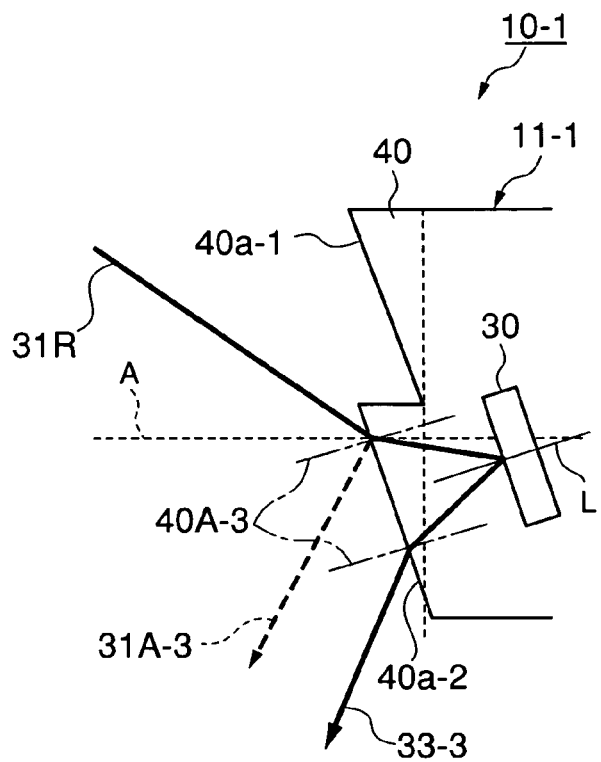
FIGS. 10A and 10B are views for explaining the relationship between the helical structure parts and roughened part of the polarized-light selective reflection layer in the projection screen for use in the projection system shown in FIG. 9.

Specifically, as shown in FIG. 10A, if the direction of the helical axis L of the helical structure part 30 is made to agree with the direction of the normal 40A-3 to the inclined plane 40a-2 in the roughened part 40, the direction in which the light 31A-3 reflected by interfacial reflection emerges agrees with the main direction in which the diffuse-reflected light 33-3 emerges. Therefore, the light from the light source for the projector (not shown in the figure) is mirrored in the projection screen, and image visibility is lowered.

Figure 10B:
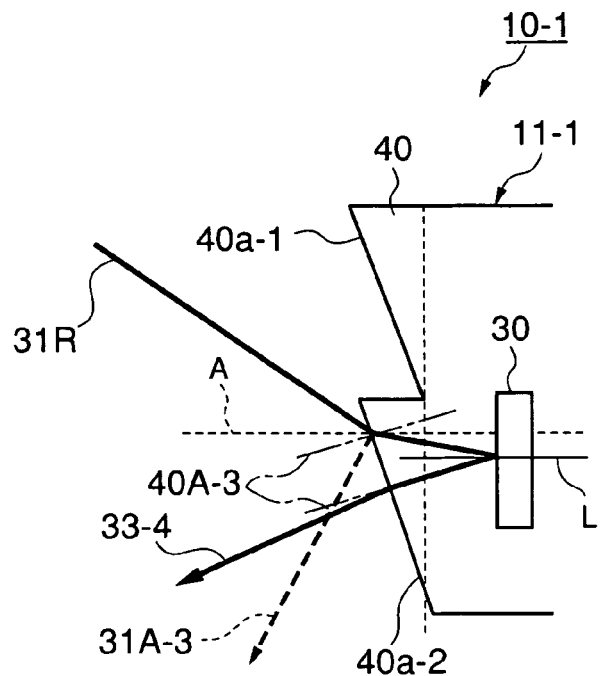

On the other hand, as shown in FIG. 10B, if the direction of the helical axis L of the helical structure part 30 is made different from the direction of the normal 40A-3 to the inclined plane 40a-2 in the roughened part 40, the direction in which the light 31A-3 reflected by interfacial reflection emerges does not agree with the main direction in which the diffuse-reflected light 33-4 emerges. It is, therefore, possible to prevent the lowering of image visibility that occurs when the light from the light source for the projector (not shown in the figure) is mirrored in the projection screen.

For the above-described reason, it is preferable that the relationship between the helical structure parts 30 and roughened part 40 of the polarized-light selective reflection layer 11-1 in the projection screen 10-1 be as shown in FIG. 10B. To establish such relationship, it is necessary to produce the helical structure parts 30 so that the directions of the helical axes L of the helical structure parts 30 do not agree with the direction of the normal to the inclined planes in the roughened part 40, unlike in the case of the polarized-light selective reflection layer 11 in the above-described projection screen 10. Therefore, in the polarized-light selective reflection layer 11-1 in the projection screen 10-1, it is preferable to make the directions of the helical axes L of the helical structure parts 30 different from the direction of the normal to the inclined planes in the roughened part 40 by controlling the directions of the helical axes L of the helical structure parts 30 without impairing the scattering property of the polarized-light selective reflection layer 11-1.

A method of producing the projection screen 10-1 shown in FIGS. 1A and 9 (i.e., the projection screen comprising the polarized-light selective reflection layer 11-1 on whose observation-side surface is integrally formed the roughened part 40) will be described below.

A first method of roughening the surface of the polarized-light selective reflection layer 11-1 is one employing cutting. In this method, the observation-side surface of the polarized-light selective reflection layer 11-1 formed on the substrate 12 is grooved by cutting, thereby integrally forming the roughened part 40 on this surface.

A second method of roughening the surface of the polarized-light selective reflection layer 11-1 is one making use of the surface roughness of a substrate 12. In this method, when a cholesteric liquid crystal layer is formed as the polarized-light selective reflection layer 11-1 on a substrate 12 with a roughened surface, the formation of the cholesteric liquid crystal layer is conducted in such a manner that the shape of the underlying layer (i.e., the surface roughness of the substrate 12) is transferred even to the observation-side surface of the cholesteric liquid crystal layer, thereby integrally forming the roughened part 40 on the observation-side surface of the polarized-light selective reflection layer 11-1.

Lastly, a third method of roughening the surface of the polarized-light selective reflection layer 11-1 is one using a mold. In this method, after forming a cholesteric liquid crystal layer with a smooth surface on a substrate 12 with a smooth surface, a mold with a roughened molding surface is pressed onto the observation-side surface of the cholesteric liquid crystal layer to roughen this surface, thereby integrally forming the roughened part 40 on the observation-side surface of the polarized-light selective reflection layer 11-1. Specifically, after softening the cholesteric liquid crystal layer by heating, the mold is pressed onto the softened cholesteric liquid crystal layer, which is then solidified in order to fix the roughness transferred. Preferably, the substrate 12 is made of a plastic sheet, for example, and has such a thickness that the polarized-light selective reflection layer 11-1 can be shaped by a mold.

As a modification of the third method, an uncured cholesteric liquid crystal solution may be poured into a mold with a roughened molding surface; the mold is separated after curing the cholesteric liquid crystal as it is.

The height of the protrusions on the roughened molding surface of the mold for use in the third method may be made, at most, approximately 10 cm, depending upon the size of the projection screen 10-1. To form inclined planes, the protrusions are required to have a certain height (a height that determines inclined planes in a roughened part with a serrate cross section, for example); however, if the height of the protrusions is not made small to a certain extent, the displayed image would be distorted. Therefore, the height of the protrusions is between 10 µm and 10,000 µm, preferably between 50 µm and 1,000 µm.

Figure 11A:
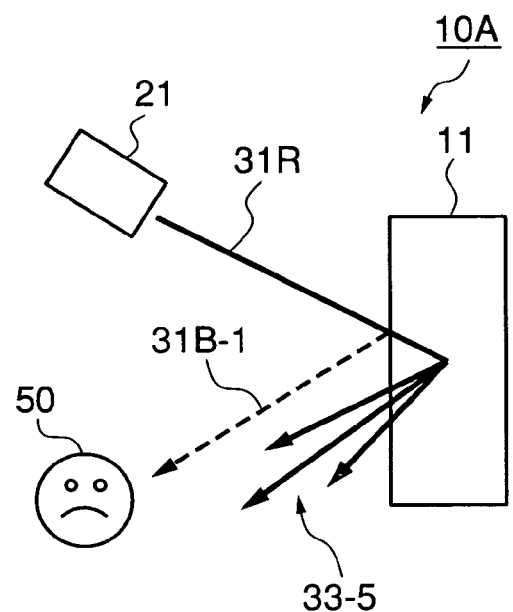
FIG. 11A is a view for explaining the concept of image display in a projection system using the projection screen shown in FIG. 1B.

For comparison, the optical function of the projection screen 10A comprising the polarized-light selective reflection layer 11 that has, on its observation-side surface, no roughened part will be described with reference to FIG. 11A, wherein imaging light is projected on the projection screen 10A from a projector 21 that is placed in the manner shown in FIG. 11A. As shown in FIG. 11A, the projector 21 is placed on the observation side of the projection screen 10A (on the side from which a viewer 50 makes observation) and projects, as imaging light, right-handed circularly polarized light 31R in the selective reflection wave range on the polarized-light selective reflection layer 11 in the projection screen 10A. The polarized-light selective reflection layer 11 in the projection screen 10A reflects the right-handed circularly polarized light 31R in the selective reflection wave range.

In the projection screen 10A, the imaging light (right-handed circularly polarized light 31R in the selective reflection wave range) projected from the projector 21 enters the polarized-light selective reflection layer 11, and, owing to the scattering property of this layer 11, the incident light is diffuse-reflected inside the polarized-light selective reflection layer 11 and is diffused as diffuse-reflected light 33-5 in a direction included in an approximately constant range.

On the other hand, part of the right-handed circularly polarized light 31R projected on the projection screen 10A from the projector 21 is reflected, by interfacial reflection (specular reflection in this case), from the observation-side surface of the polarized-light selective reflection layer 11, and returns, as light 31B-1 reflected by interfacial reflection, to the observation side.

A viewer 50 can observe the diffuse-reflected light 33-5 that is diffused and returned toward the viewer 50. However, as shown in FIG. 11A, since the direction in which the light 31B-1 reflected, by interfacial reflection, from the polarized-light selective reflection layer 11 emerges is nearly the same as the main direction in which the light 33-5 diffuse-reflected from the polarized-light selective reflection layer 11 emerges, the viewer 50 observes not only the diffuse-reflected light 33-5 but also the light 31B-1 reflected by interfacial reflection. This means that the projection screen 10A mirrors the light from the light source for the projector 21 and provides decreased image visibility.

Figure 11B:
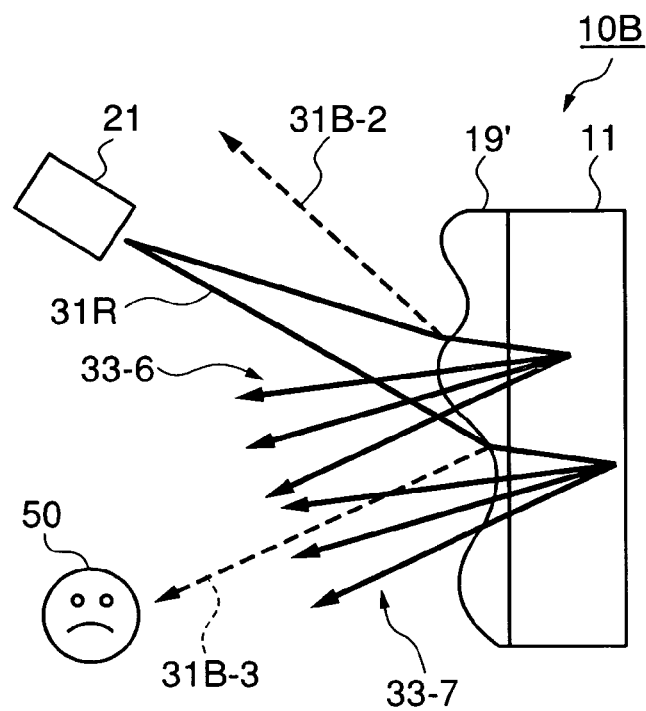
FIG. 11B is a view for explaining the concept of image display in a projection system using a projection screen that is obtained by forming an anti-glaring layer on the observation-side surface of the projection screen shown in FIG. 1B.

To solve this problem with the projection screen 10A, there has been proposed a projection screen 10B comprising a polarized-light selective reflection layer 11 that has, on its observation-side surface, an anti-glaring (AG) layer 19' (see FIG. 11B). The optical function of such a projection screen 10B will be described with reference to the case where imaging light is projected on the projection screen 10B from a projector 21 that is placed in the manner shown in FIG. 11B. As shown in FIG. 11B, the projector 21 is placed on the observation side of the projection screen 10B (on the side from which a viewer 50 makes observation) and projects, as imaging light, right-handed circularly polarized light 31R in the selective reflection wave range on the polarized-light selective reflection layer 11 in the projection screen 10B. The polarized-light selective reflection layer 11 in the projection screen 10B reflects the right-handed circularly polarized light 31R in the selective reflection wave range.

In the projection screen 10B, the imaging light (right-handed circularly polarized light 31R in the selective reflection wave range) projected from the projector 21 firstly passes through the anti-glaring (AG) layer 19' and then enters the polarized-light selective reflection layer 11. This incident light is diffuse-reflected inside the polarized-light selective reflection layer 11 owing to the scattering property of this layer 11 and is diffused as diffuse-reflected light 33-6, 33-7 in directions included in an approximately constant range.

On the other hand, part of the right-handed circularly polarized light 31R projected on the projection screen 10B from the projector 21 is reflected, by interfacial reflection (specular reflection in this case), from the observation-side surface of the anti-glaring layer 19' that is provided on the polarized-light selective reflection layer 11, and returns, as light 31B-2, 31B-3 reflected by interfacial reflection, to the observation side.

A viewer 50 can observe the diffuse-reflected light 33-6, 33-7 that is diffused and returned toward the viewer 50. However, as shown in FIG. 11B, since the direction in which part of the light reflected by interfacial reflection (the light 31B-3 reflected by interfacial reflection, in this case) from the anti-glaring layer 19' provided on the polarized-light selective reflection layer 11 emerges is nearly the same as the main direction in which the light 33-6, 33-7 diffuse-reflected from the polarized-light selective reflection layer 11 emerges, the viewer 50 observes not only the diffuse-reflected light 33-6, 33-7 but also the light 31B-3 reflected by interfacial reflection. This means that the projection screen 10B mirrors the light from the light source for the projector 21 and provides decreased image visibility.

In general, an anti-glaring layer simply hazes light that passes through it, and when this layer is provided on the surface of a projection screen, it scatters reflected light produced by interfacial reflection and returns the reflected light to the observation side. For this reason, when an anti-glaring layer is provided on the surface of a projection screen, even in such a situation that mirroring of light from a light source for a projector occurs, it is possible to scatter, thanks to the action of the anti-glaring layer, the light from the light source that has been reflected by interfacial reflection, and to prevent a viewer from observing the light from the light source. However, such an anti-glaring layer reflects, toward the observation side, the light from the light source while scattering it, so that when black is displayed, it is difficult to recognize it as black. Moreover, since polarized-light separation exerts no effect on the light reflected by interfacial reflection, the anti-glaring layer cannot increase image contrast. Consequently, such a projection screen comprising a polarized-light selective reflection layer provided with an anti-glaring layer is expected to produce only the effects equal to those ones obtainable by conventional matte screens, and provides decreased image contrast.

Thus, the projection screen 10A shown in FIG. 11A and the projection screen 10B shown in FIG. 11B cannot provide fully improved image visibility.

However, according to the aforementioned projection screen 10-1 shown in FIGS. 1A and 9, the roughened part 40 for controlling the direction of interfacial reflection of imaging light that is projected on the polarized-light selective reflection layer 11-1 is provided on the observation-side surface of the polarized-light selective reflection layer 11-1, and the shape of the face of this roughened part 40 is determined so that the imaging light that is reflected from the surface of the roughened part 40 by interfacial reflection (light 31A, 31A-1, 31A-2 reflected by interfacial reflection) emerges in a direction different from the main direction in which the imaging light diffuse-reflected from the polarized-light selective reflection layer 11-1 (diffuse-reflected light 33, 33-1, 33-2) emerges. Therefore, even when the imaging light projected from the observation side is reflected from the polarized-light selective reflection layer 11-1 by interfacial reflection, a viewer never simultaneously observes the light 31A, 31A-1, 31A-2 reflected by interfacial reflection and the diffuse-reflected light 33, 33-1, 33-2. It is thus possible to prevent the projection screen 10-1 from mirroring the light from the light source for the projector 21, thereby improving image visibility.

Figure 12:
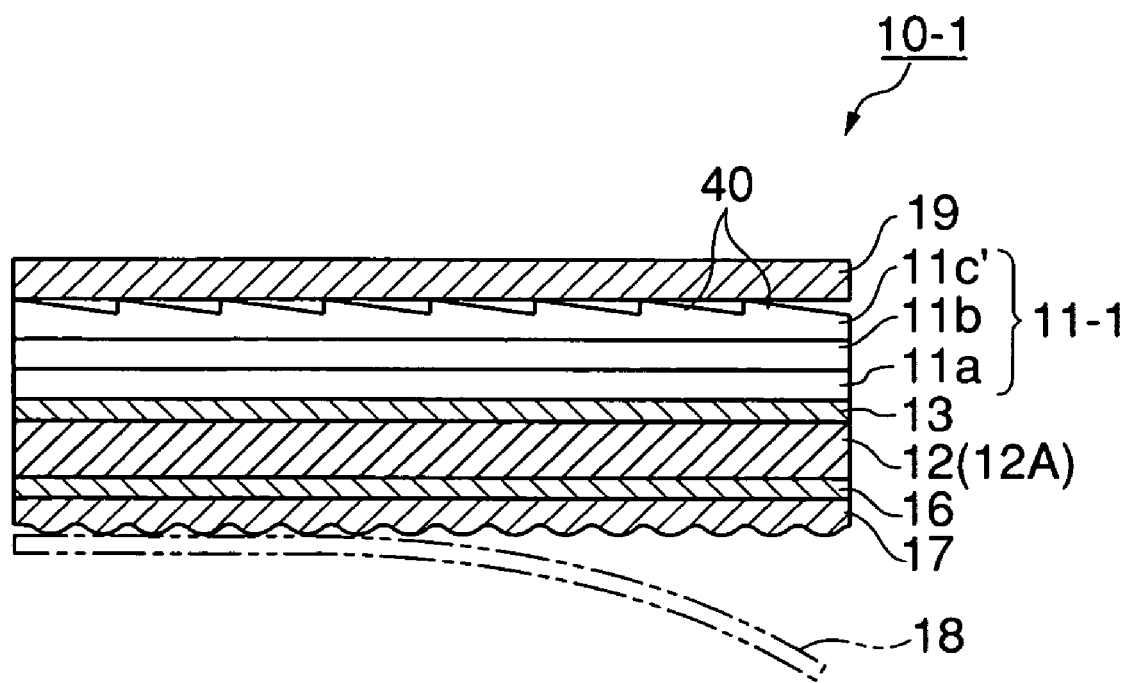
FIG. 12 is a diagrammatic sectional view showing a modification of the projection screen shown in FIG. 1A.

In the above-described projection screen 10-1, a light-reflecting layer 16 for reflecting light that is incident on the substrate 12 may be provided on the surface of the substrate 12 opposite to the side on which the polarized-light selective reflection layer 11-1 is provided, as shown in FIG. 12. When a light-reflecting layer 16 is provided on the substrate 12 that contains a light-absorbing layer in the manners shown in FIGS. 4 to 6, environmental light, such as sunlight and light from lighting fixtures, incident on the back surface of the projection screen 10-1 can be effectively reflected before reaching the substrate 12 (especially, the light-absorbing layer contained in the substrate 12). It is, therefore, possible to effectively prevent the substrate 12 from generating heat. Preferable examples of materials for the light-reflecting layer 16 include white-colored scattering layers (paper, white-colored films, coatings, etc.), metallic plates, and aluminum powder films.

Further, as shown in FIG. 12, a pressure-sensitive adhesive layer 17 useful for affixing, to an external member, the substrate 12 on which the polarized-light selective reflection layer 11-1 is formed may be provided on the substrate 12 opposite to the side on which the polarized-light selective reflection layer 11-1 is provided (on the backside of the light-reflecting layer 16 in FIG. 12). If a pressure-sensitive adhesive layer 17 is so provided, the projection screen 10-1 can be affixed to an external member such as a white board or wall, if necessary. The pressure-sensitive adhesive layer 17 is preferably a layer that can separably adhere, to an external member, the substrate 12 on which the polarized-light selective reflection layer 11-1 is formed. It is, therefore, preferable to use, as the pressure-sensitive adhesive layer 17, a pressure-sensitive adhesive film with slight tackiness such as a releasable, pressure-sensitive adhesive film (manufactured by Panack Co., Ltd., Japan). Moreover, it is preferable to cover the surface of the pressure-sensitive adhesive layer 17 with a releasing film 18 in order to protect the pressure-sensitive adhesive layer 17 before use.

Figure 8A:
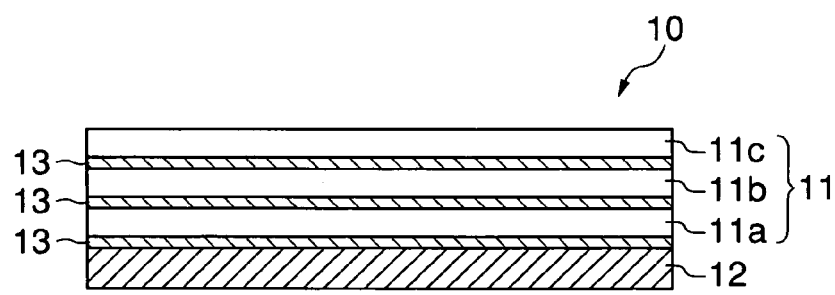
FIGS. 8A and 8B are diagrammatic sectional views showing other modifications of the projection screen shown in FIG. 1B.
Figure 8B:
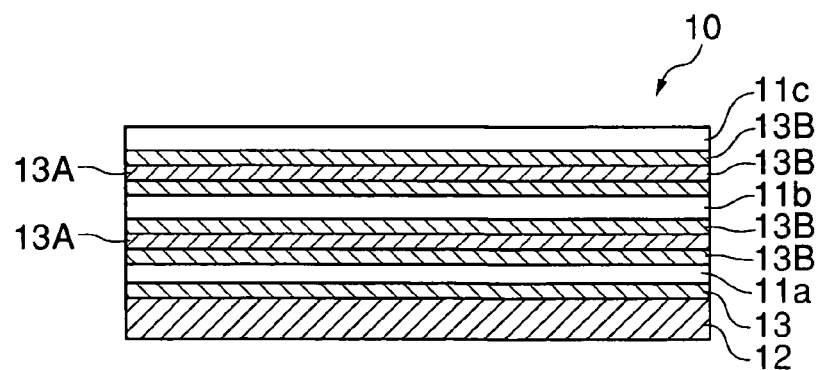

Furthermore, as shown in FIG. 12, a functional layer 19 may be provided on the observation-side surface of the polarized-light selective reflection layer 11-1. A variety of layers including hard coat (HC) layers, anti-reflection (AR) layers, ultraviolet-light-absorbing (UV-absorbing) layers, and antistatic (AS) layers can be used as the functional layer 19. The intermediate layers 13, 13A and 13B as shown in FIGS. 8A and 8B, the details of which will be described later, can be disposed between the observation-side partial selective reflection layer 11c of the polarized-light selective reflection layer 11 and the functional layer 19.

The hard coat (HC) layer is for protecting the surface of the projection screen 10-1 and preventing it from being scratched or staining. The anti-reflection (AR) layer is for preventing the surface of the projection screen 10-1 from reflecting light. The ultraviolet-light-absorbing (UV-absorbing) layer is for absorbing the ultraviolet light component of light incident on the projection screen 10-1, the UV component causing yellowing of the liquid crystalline composition. The antistatic (AS) layer is for removing static electricity that is generated in the projection screen 10-1. In the case where the antistatic layer is used as the functional layer 19, this layer is not necessarily provided on the observation-side surface of the polarized-light selective reflection layer 11-1, and may be provided on the back surface of the substrate 12. Moreover, carbon particles or the like may be incorporated in the substrate 12, thereby imparting, to the substrate 12 itself, the property of removing static electricity.

In FIG. 12, the polarized-light selective reflection layer 11-1 in the projection screen 10-1 is composed of a plurality of partial selective reflection layers 11a, 11b and 11c' that are laminated to each other, and the roughened part 40 is provided on the observation-side surface of the partial selective reflection layer 11c', the outermost layer on the observation side.

[Modifications of the Projection Screen]

In the projection screen 10-1 according to the above-described embodiment, the roughened part 40 provided on the observation-side surface of the polarized-light selective reflection layer 11-1 has a plurality of inclined planes 40a, 40a-1, 40a-2 that are disposed regularly. Such a regularly roughened structure can, depending upon its shape, produce stray light that adversely affects the image displayed. Specifically, when the light from the light source for the projector 21, mirrored in the projection screen (hot spot), is reflected from the surface of the roughened part 40 not toward a viewer 50 but in any other direction, part of this reflected light (hot spot light) enters the roughened part 40; then, the light entering the roughened part 40 is repeatedly reflected inside the roughened part 40 because of the repeated roughness of the roughened part 40 to become so-called stray light. Such stray light finally emerges from the outermost surface of the roughened part 40 to appear as a band-shaped pattern (hot band).

The possibility that such a hot band appears becomes stronger as the intensity of the light reflected from the surface of the roughened part 40 by interfacial reflection becomes greater than that of the imaging light diffuse-reflected from the polarized-light selective reflection layer 11-1. The intensity of the imaging light diffuse-reflected from the polarized-light selective reflection layer 11-1 can be increased by controlling the state of polarization of the imaging light projected from the projector 21 so as to agree with the state of polarization of the light reflected from the polarized-light selective reflection layer 11-1. The intensity of the light reflected from the surface of the roughened part 40 by interfacial reflection keeps constant regardless of the state of polarization of the imaging light.

Thus, when unpolarized light projected from the projector 21 enters the projection screen 10-1, there is a great possibility that such a hot band appears. This is because the intensity of the light reflected from the surface of the roughened part 40 by interfacial reflection becomes relatively high while the intensity of the imaging light diffuse-reflected from the polarized-light selective reflection layer 11-1 being relatively low.

Since such a hot band decreases image visibility, it is preferable to eliminate it as much as possible. A possible means useful for this purpose is that random roughness is incorporated in the regularly roughened structure. When this means is employed, the regularly roughened structure is slightly deformed, and the directivity of stray light that is usually produced by a regularly roughened structure is not produced. Specifically, this can be achieved by irregularly deforming (roughening) the surface of the regularly roughened structure (inclined planes 40a, 40a-1, 40a-2) by sandblasting or the like, for example. Alternatively, the surface of the regularly roughened structure may be irregularly deformed (roughened) by either a physical or chemical method.

Next, explanation for modifications of the roughened part 40 on the observation-side surface of the polarized-light selective reflection layer 11 will be given below with reference to FIGS. 13A to 13C.

Figure 13A:
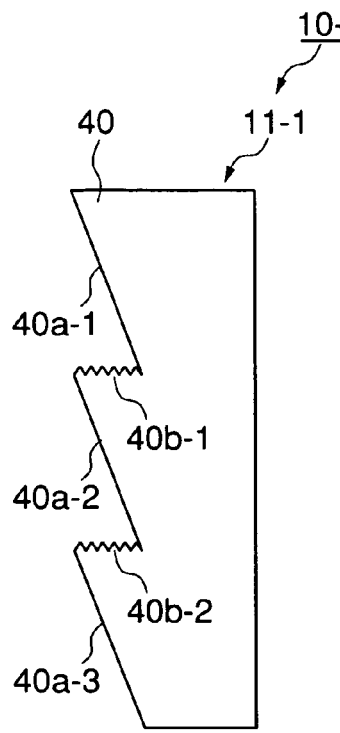
FIGS. 13A to 13C are diagrammatic sectional views showing modifications of the roughened part of the polarized-light selective reflection layer in the projection screen shown in FIG. 1A.
Figure 13B:
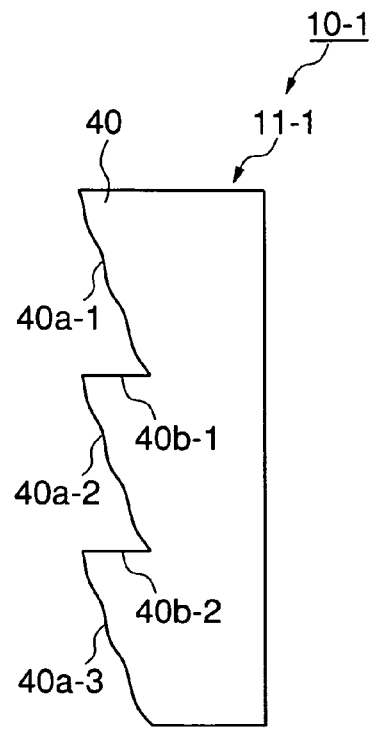
Figure 13C:
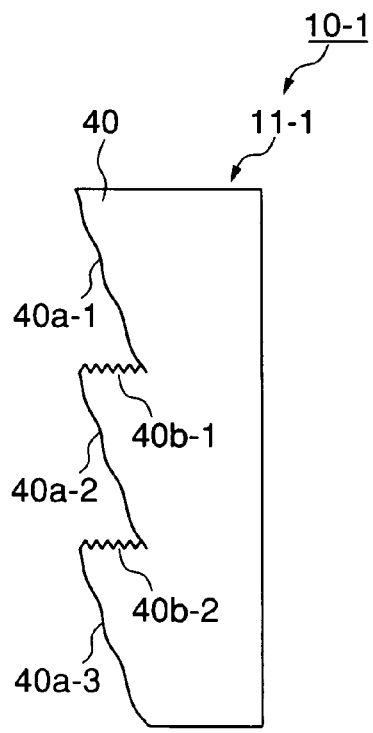
Figure 16A:
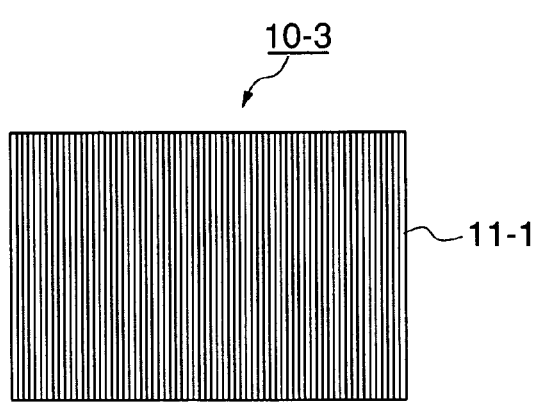
FIGS. 16A to 16D are diagrammatic views showing projection screens according to still further embodiments of the present invention.
Figure 16B:
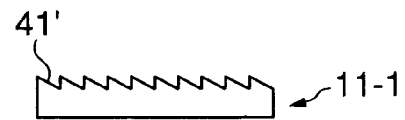
Figure 16C:
Figure 16D:
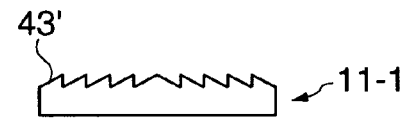

As shown in FIGS. 13A to 13C, the roughened part 40 in every embodiment has: a plurality of inclined planes (first planes) 40a-1, 40a-2 and 40a-3, the direction of the normal to each inclined plane 40a-1, 40a-2, 40a-3 being different from the direction of the normal to the projection screen 10-1; a side plane (second plane) 40b-1 formed so as to connect the inclined planes 40a-1 and 40a-2; and a side plane (second plane) 40b-2 formed so as to connect the inclined planes 40a-2 and 40a-3. In addition, the roughened part 40 in every embodiment has an irregularly deformed (roughened) structure in any portion on the surface of the roughened part 40. Due to the irregularly deformed (roughened) structure of the roughened part 40, the direction of the stray light emerging from the roughened part 40 is controlled; thus, it is possible to suppress the hot band that may be caused when unpolarized light projected from the projector 21 enters the projection screen 10-1.

FIG. 13A shows a first embodiment of the roughened part 40 that is formed on the observation-side surface of the polarized-light selective reflection layer 11 of the projection screen 10-1. As shown in FIG. 13A, in this first embodiment of the roughened part 40, the side planes 40b-1 and 40b-2 have scattering portions that scatter light passing through the side planes 40b-1 and 40b-2. The scattering portions function as the irregularly deformed (roughened) structure and have diffusing properties. The scattering portions on the side planes 40b-1 and 40b-2 can be formed as integral parts of the roughened part 40, or as separate parts of the roughened part 40.

Thus, according to the projection screen 10-1 shown in FIG. 13A, even when part of right-handed circularly polarized light 31R projected from the projector 21 and part of light reflected by interfacial reflection enters the roughened part 40 through the side planes 40b-1 and 40b-2, it is possible to scatter part of the right-handed circularly polarized light 31R and part of the light reflected by interfacial reflection, due to the scattering portions formed on the side planes 40b-1 and 40b-2.

Specifically, the side plane 40b-1 can scatter part of right-handed circularly polarized light 31R entering through the side plane 40b-1, or part of light reflected by interfacial reflection entering through the side plane 40b-1 after being reflected at the inclined plane 40a-1. Also, the side plane 40b-2 can scatter part of right-handed circularly polarized light 31R entering through the side plane 40b-2, or part of light reflected by interfacial reflection entering through the side plane 40b-2 after being reflected at the inclined plane 40a-2.

According to the projection screen 10-1 shown in FIG. 13A, it is thus possible to suppress the intensity of stray light caused inside the roughened part 40 so that the hot band does not clearly appear.

FIG. 13B shows a second embodiment of the roughened part 40 that is formed on the observation-side surface of the polarized-light selective reflection layer 11 of the projection screen 10-1. As shown in FIG. 13B, in this second embodiment of the roughened part 40, the inclined planes 40a-1, 40a-2 and 40a-3 have dispersion portions (deformed portions) that disperse a direction of light that is reflected at each inclined planes 40a-1, 40a-2, 40a-3, or a direction of light that emerges from each inclined planes 40a-1, 40a-2, 40a-3 after the light, which enters from each side plane 40b-1, 40b-2, is repeatedly reflected inside the roughened part 40. The dispersion portions on the inclined planes 40a-1, 40a-2 and 40a-3 can be formed as integral parts of the roughened part 40, or as separate parts of the roughened part 40.

Thus, according to the projection screen 10-1 shown in FIG. 13B, even when part of right-handed circularly polarized light 31R projected from the projector 21 and part of light reflected by interfacial reflection enters the roughened part 40 through the side planes 40b-1 and 40b-2 so that stray light is caused inside the roughened part 40, it is possible to disperse the direction of such stray light, due to the dispersion portions formed on the inclined planes 40a-1, 40a-2 and 40a-3. It is noted that the main normal direction of each inclined plane 40a-1, 40a-2, 40a-3 is different from the direction of the normal to the projection screen 10-1 because the inclined plane 40a-1, 40a-2, 40a-3 have dispersion portions thereon. The "main normal direction" herein means the direction obtained by calculating the average of normal vectors at points on each inclined plane 40a-1, 40a-2, 40a-3.

Specifically, the inclined plane 40a-1 can disperse the direction of part of right-handed circularly polarized light 31R entering the inclined plane 40a-1 after being reflected at the side plane 40b-1. The inclined plane 40a-2 can disperse the direction of stray light when the stray light emerges from the inclined plane 40a-2. This stray light is caused inside the roughened part 40, due to part of right-handed circularly polarized light 31R entering through the side plane 40b-1, or part of light reflected by interfacial reflection entering through the side plane 40b-1 after being reflected at the inclined plane 40a-1. The inclined plane 40a-2 can also disperse the direction of part of right-handed circularly polarized light 31R entering the inclined plane 40a-2 after being reflected at the side plane 40b-2. The inclined plane 40a-3 can disperse the direction of stray light when the stray light emerges from the inclined plane 40a-3. This stray light is caused inside the roughened part 40, due to part of right-handed circularly polarized light 31R entering through the side plane 40b-2, or part of light reflected by interfacial reflection entering through the side plane 40b-2 after being reflected at the inclined plane 40a-2.

According to the projection screen 10-1 shown in FIG. 13B, it is thus possible to suppress the intensity of stray light caused inside the roughened part 40 so that the hot band does not clearly appear.

FIG. 13C shows a third embodiment of the roughened part 40 that is formed on the observation-side surface of the polarized-light selective reflection layer 11 of the projection screen 10-1. As shown in FIG. 13C, this third embodiment of the roughened part 40 is obtained by combining the first embodiment of the roughened part 40 shown in FIG. 13A with the second embodiment of the roughened part 40 shown in FIG. 13B; the side planes 40b-1 and 40b-2 have scattering portions thereon, and the inclined planes 40a-1, 40a-2 and 40a-3 have dispersion portions thereon. It is noted that the main normal direction of each inclined plane 40a-1, 40a-2, 40a-3 is different from the direction of the normal to the projection screen 10-1 because the inclined plane 40a-1, 40a-2, 40a-3 have dispersion portions thereon. The "main normal direction" herein means the direction obtained by calculating the average of normal vectors at points on each inclined plane 40a-1, 40a-2, 40a-3.

Thus, according to the projection screen 10-1 shown in FIG. 13C, even when part of right-handed circularly polarized light 31R projected from the projector 21 and part of light reflected by interfacial reflection enters the roughened part 40 through the side planes 40b-1 and 40b-2, it is possible to scatter part of the right-handed circularly polarized light 31R and part of the light reflected by interfacial reflection, due to the scattering portions formed on the side planes 40b-1 and 40b-2. In addition, even when part of right-handed circularly polarized light 31R projected from the projector 21 and part of light reflected by interfacial reflection enters the roughened part 40 through the side planes 40b-1 and 40b-2 so that stray light is caused inside the roughened part 40, it is possible to disperse the direction of such stray light, due to the dispersion portions formed on the inclined planes 40a-1, 40a-2 and 40a-3.

According to the projection screen 10-1 shown in FIG. 13C, it is thus possible to further suppress the intensity of stray light caused inside the roughened part 40 so that the hot band does not clearly appear, compared with the projection screens 10-1 shown in FIGS. 13A and 13B.

Next, explanation for modifications of the inclined planes 40a-1, 40a-2 and 40a-3 of the roughened part 40 on the observation-side surface of the polarized-light selective reflection layer 11 of the projection screen shown in FIGS. 13A to 13C will be given below with reference to FIGS. 14A and 14B.

As shown in FIG. 14A, the roughened part 40 may comprise a plurality of the inclined planes having different inclined angles (i.e., the inclined plane 40a-1 having an inclined angle $\alpha$, the inclined plane 40a-2 having an inclined angle $\beta$, the inclined plane 40a-3 having an inclined angle $\gamma$). It is preferable that the inclined angles $\alpha$ and $\gamma$ fall within the range of the inclined angle $\beta \pm 50\%$, when taking the inclined angle $\beta$ having middle value (e.g., 1–45°) as a standard angle.

In this case, since the direction of stray light emerging from the inclined planes 40a-1, 40a-2 and 40a-3 changes according to the inclined angles, it is possible to further disperse the direction of such stray light due to the inclined planes 40a-1, 40a-2 and 40a-3.

As shown in FIG. 14B, the roughened part 40 may comprise a plurality of the inclined planes having different inclined pitches (lengths of the bottoms of the inclined planes) (i.e., the inclined plane 40a-1 having a pitch "a-1", the inclined plane 40a-2 having a pitch "a-2", the inclined plane 40a-3 having a pitch "a-3"). It is preferable that the pitches of a-1, a-2 and a-3 are with the range of 30 to 1000 µm.

In this case, in the roughened part 40 of circular type, since the direction of stray light emerging from the inclined planes 40a-1, 40a-2 and 40a-3 changes according to the pitches, it is possible to further disperse the direction of such stray light due to the inclined planes 40a-1, 40a-2 and 40a-3.

In the projection screen 10-1 according to the above-described embodiment, the roughened part 40 provided on the observation-side surface of the polarized-light selective reflection layer 11-1 has a serrate cross section as a whole. More specifically, as in the projection screen 10-2 shown in FIG. 15A, the roughened part 41, 42, 43 with a serrate cross section (see FIGS. 15B, 15C and 15D, respectively) is integrally formed on the observation-side surface of the polarized-light selective reflection layer 11-1 in such a manner that the longer direction of the serrate cross section agrees with the horizontal direction of the polarized-light selective reflection layer 11-1. In the polarized-light selective reflection layer 11-1 shown in FIG. 15B, the roughened part 41 with a serrate cross section is provided in such a manner that the units of the serration that face almost downward (inclined planes that face almost upward) are continuously aligned. In the polarized-light selective reflection layer 11-1 shown in FIG. 15C, the roughened part 42 with a serrate cross section is provided in such a manner that the units of the serration that face almost upward are continuously aligned. In the polarized-light selective reflection layer 11-1 shown in FIG. 15D, the roughened part 43 with a serrate cross section is provided in such a manner that the units of the serration that face approximately the center are continuously aligned.

Besides the projection screens 10-2 shown in FIGS. 15A to 15D, the present invention encompasses projection screens 10-3 shown in FIGS. 16A to 16D in which the roughened part 41', 42', 43' with a serrate cross section (see FIGS. 16B, 16C and 16D, respectively) is integrally formed on the observation-side surface of the polarized-light selective reflection layer 11-1 in such a manner that the longer direction of the serrate cross section agrees with the vertical direction of the polarized-light selective reflection layer 11-1. In the polarized-light selective reflection layer 11-1 shown in FIG. 16B, the roughened part 41' with a serrate cross section is provided in such a manner that the units of the serration that face almost the left side (inclined planes that face almost the right side) are continuously aligned. In the polarized-light selective reflection layer 11-1 shown in FIG. 16C, the roughened part 42' with a serrate cross section is provided in such a manner that the units of the serration that face almost the right side are continuously aligned. In the polarized-light selective reflection layer 11-1 shown in FIG. 16D, the roughened part 43' with a serrate cross section is provided in such a manner that the units of the serration that face approximately the center are continuously aligned.

Figure 17A:
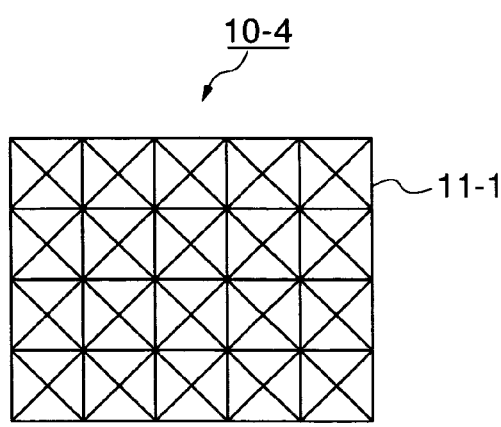
FIGS. 17A and 17B are diagrammatic views showing a projection screen according to a yet further embodiment of the present invention.
Figure 17B:
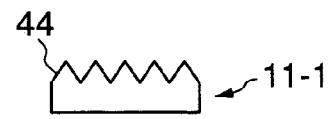

The present invention encompasses not only the projection screens 10-2 shown in FIGS. 15A to 15D and the projection screens 10-3 shown in FIGS. 16A to 16D but also a projection screen 10-4 shown in FIGS. 17A and 17B in which a roughened part 44 composed of a plurality of pyramidal units (quadrangular pyramidal units in this case) that are two-dimensionally, continuously arranged is integrally formed on the observation-side surface of the polarized-light selective reflection layer 11-1.

In the above description, explanation is given by referring to the case where the projection screen 10-1, 10-2, 10-3, 10-4 comprises the polarized-light selective reflection layer 11-1 whose structure is the same as that of the polarized-light selective reflection layer 11 shown in FIG. 2A, that is, the polarized-light selective reflection layer 11 having a cholesteric liquid crystalline structure not in the state of planar orientation, in which the helical axes L extend in different directions. Instead of such a polarized-light selective reflection layer, it is possible to use a polarized-light selective reflection layer having any structure as long as it can selectively diffuse-reflect a specific polarized-light component.

Specifically, for example, the polarized-light selective reflection layer 11-1 may comprise a polarized-light selective reflection layer body for selectively reflecting a specific polarized-light component (e.g., a polarized-light selective reflection layer having such a cholesteric liquid crystalline structure in the state of planar orientation as is shown in FIG. 2B, causing specular reflection) and a diffusing element for diffusing the light reflected from the polarized-light selective reflection layer body. By so constituting the polarized-light selective reflection layer 11-1, it is possible to make the polarized-light-separating property and diffusing properties independent of each other, and is thus possible to easily control these two properties. The diffusing element may be any one of bulk diffusers, surface diffusers and hologram diffusers, or any combination of these diffusers. A bulk diffuser may be particles dispersed in a transparent medium, for example. A surface diffuser may be a structured, microstructured, or roughened surface, for example. The diffusion provided by the diffuser may be random, regular, or partly regular.

The polarized-light selective reflection layer 11-1 may also be a layer that diffuse-reflects, as the specific polarized-light component, linearly polarized light. Linearly polarized light includes light in two different states of polarization, the directions of vibration being at right angles to each other. Therefore, by making the direction of linear polarization of light to be emitted from a projector agree with the direction of linear polarization of light the polarized-light selective reflection layer 11-1 diffuse-reflects, it is possible to display a bright image. Further, for example, a multi-layered reflective polarizer having diffusing properties, made from materials different in refractive index (e.g., DBEF manufactured by Sumitomo 3M Limited, Japan), can be given as the layer that diffuse-reflects linearly polarized light as the specific polarized-light component. Linearly polarized light is composed of so-called P-polarized light (a component parallel to the plane of incidence) and S-polarized light (a component perpendicular to the plane of incidence). Therefore, when the layer that diffuse-reflects linearly polarized light diffuse-reflects only a specific polarized-light component (e.g., P- or S-polarized light), it can increase image contrast like the above-described polarized-light selective reflection layer 11. Further, this layer can effectively reflect imaging light if the imaging light to be projected on the layer is made to mainly contain P- or S-polarized light.

Although the above embodiment is described by referring to the case where the substrate 12, a component of the projection screen 10-1, 10-2, 10-3, 10-4, is an absorptive substrate containing a light-absorbing layer that absorbs light in the visible region, the substrate 12 may also be a transparent substrate capable of transmitting at least part of light in the visible region. If a transparent substrate is used, although the advantage of enhancing image contrast is lost, the projection screens 10-1 to 10-4 are highly transparent while not displaying an image, and the background can thus be clearly seen through the projection screens. Such projection screens 10-1 to 10-4 can be used in decorative applications; for example, they are fit for use on show windows. Moreover, by switching the viewing angle according to the situation, it is possible to produce a more effective eye-catching effect. For this reason, these projection screens can overcome the drawback of conventional information tools using projectors that they are not attractive in a bright environment, and can effectively be used in such applications as billboards, bulletin boards, guideboards, and rear windows of automobiles. Although the transparent substrate is preferably less hazy, any material selected from acrylic resins, glass, vinyl chloride resins, etc. may be used for the substrate as long as it can transmit light. Further, the transparent substrate is not necessarily colorless, and a colored one may also be used. Specifically, it is possible to use transparent plastic or glass plates in a color of brown, blue, orange, or the like that are usually used for partition walls, windows, and so forth.

Further, in the projection screens 10-1 to 10-4, an intermediate layer 13 having adherent properties (an adherent layer) may be provided between the polarized-light selective reflection layer 11-1 and the substrate 12, or between each neighboring two of the partial selective reflection layers that constitute the polarized-light selective reflection layer 11-1. The intermediate layer 13 may have barrier properties in addition to (or in place of) the adherent properties. Specifically, as shown in FIG. 8A, the intermediate layers 13 having barrier properties (and, if necessary, adherent properties) can be provided between the partial selective reflection layer 11a of the polarized-light selective reflection layer 11 and the substrate 12, or between each neighboring two of the partial selective reflection layers 11a, 11b and 11c that constitute the polarized-light selective reflection layer 11-1. The barrier properties herein mean the following action: when the polarized-light selective reflection layer is laminated directly to the substrate, or when one partial selective reflection layer is laminated directly to another partial selective reflection layer, the constituents of the lower layer are prevented from migrating to (permeating through) the upper layer, or the constituents of the upper layer are prevented from migrating to (permeating through) the lower layer. If substances migrate between the upper and lower layers, the optical properties (wavelength selectivity, polarization selectivity, diffusing properties, etc.) inherent in the polarized-light selective reflection layer (or each partial selective reflection layer) that is the upper or lower layer are impaired. However, this can be prevented by the use of the above-described intermediate layer having barrier properties (barrier layer). Specifically, for example, in the case where a partial selective reflection layer is laminated to another partial selective reflection layer by applying a cholesteric liquid crystalline composition, a nematic liquid crystal component contained in the liquid crystalline composition for forming the upper partial selective reflection layer may permeate through the lower partial selective reflection layer to change (increase) the helical pitch in the lower partial selective reflection layer, depending upon the materials of the liquid crystalline composition, the process conditions, and the like. However, even in this case, if a barrier layer is provided between the lower and upper partial selective reflection layers, the migration (permeation) of the nematic liquid crystal component does not occur, and the optical properties (wavelength selectivity, polarization selectivity, diffusing properties, etc.) of the partial selective reflection layers are successively maintained.

Although the embodiment shown in FIG. 8A employs the intermediate layers 13 having barrier properties (and, if necessary, adherent properties) as an intermediate layer provided between each neighboring two of the partial selective reflection layers 11a, 11b and 11c that constitute the polarized-light selective reflection layer 11-1, the combination of the intermediate layer 13A and the intermediate layers 13B laminated both on the sides of the intermediate layer 13A, as shown in FIG. 8B, may also be employed as such an intermediate layer. It is noted that the intermediate layer 13A has only barrier properties whereas the intermediate layers 13B has adherent properties.

Examples of materials that can be used for forming such a barrier layer include modified acrylates, urethane acrylates, polyester acrylates, and epoxy resins. These compounds may be either monofunctional or polyfunctional and include monomers and oligomers. Specific examples of these compounds include ethoxylated trimethylolpropane triacrylate, propoxylated glyceryl triacrylate, pentaerythritol tetraacrylate, ditrimethylolpropane tetraacrylate, dipentaerythritol hydroxypentaacrylate, ethoxylated pentaerythritol tetraacrylate, pentaacrylic ester, pentaerythritol triacrylate, trimethylolpropane triacrylate, trimethylolpropane PO-modified triacrylate, isocyanuric acid EO-modified triacrylate, trimethylolpropane EO-modified triacrylate, dipentaerythritol penta- or hexa-acrylate, urethane adducts, aliphatic polyamine epoxy resins, polyaminoamide epoxy resins, aromatic diamine epoxy resins, alicyclic diamine epoxy resins, phenolic epoxy resins, amino epoxy resins, mercaptan epoxy resins, dicyandiamide epoxy resins, and Lewis acid complex epoxy resins.

Projection System

Figure 18:
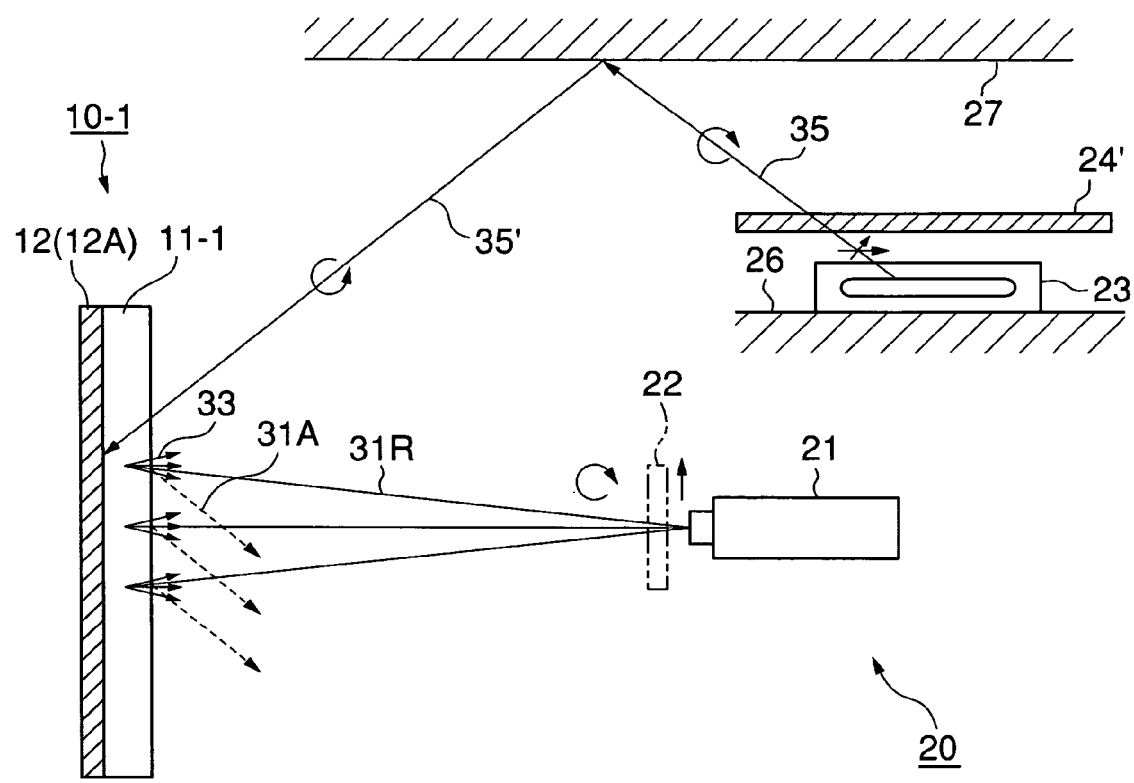
FIG. 18 is a diagrammatic view showing a projection system comprising the projection screen shown in FIG. 1A.

The above-described projection screen 10-1, 10-2, 10-3, 10-4 can be incorporated into a projection system 20 comprising a projector 21, as shown in FIG. 18. Although explanation will now be given by referring to the projection system 20 comprising the projection screen 10-1, the basic construction and actions of a projection system comprising any one of the other projection screens 10-2 to 10-4 are the same as those of the projection system 20 comprising the projection screen 10-1.

As shown in FIG. 18, the projection system 20 comprises the projection screen 10-1 and the projector 21 for projecting imaging light on the projection screen 10-1.

Of these components, the projector 21 may be of any type, and a CRT projector, a liquid crystal projector, a DLP (digital light processing) projector, or the like can be used. It is, however, preferable that the imaging light to be projected on the projection screen 10-1 from the projector 21 chiefly contains a polarized-light component (e.g., right-handed circularly polarized light) that is identical with the polarized-light component which the projection screen 10-1 selectively reflects.

Because of its operating principle, a liquid crystal projector useful as the projector 21 usually emits light that is polarized substantially linearly. In this case, by letting the imaging light emerge from the projector 21 through a retardation layer 22 or the like, it is possible to convert the linearly polarized light into circularly polarized light without causing the loss of the amount of light.

A quarter wave plate is preferably used as the retardation layer 22. Specifically, an ideal retardation layer is one capable of causing a phase shift of 137.5 nm for light of 550 nm whose visibility is highest. Further, a wide-wave-range quarter wave plate is more preferable because it is applicable to light in all of the red (R), green (G) and blue (B) color wave ranges. It is also possible to use a single retardation layer produced by controlling the birefringence of a material for this layer, or a retardation layer using a quarter wave plate in combination with a half wave plate.

The retardation layer 22 may be externally attached to the exit aperture of the projector 21, as shown in FIG. 18, or internally placed in the projector 21.

When a CRT or DLP projector is used as the projector 21, since the projector 21 emits unpolarized light, it is necessary to use a circular polarizer composed of a linear polarizer and a retardation layer in order to convert the unpolarized light into circularly polarized light. If such a circular polarizer is used, although the amount of light emitted from the projector 21 itself is decreased to half, it is possible to effectively prevent the production of stray light or the like from a polarized-light component (e.g., left-handed circularly polarized light) that is different from the polarized-light component which the polarized-light selective reflection layer 11-1 in the projection screen 10-1 selectively reflects, thereby enhancing image contrast. In the case where linearly polarized light is produced by an optical system incorporated in the projector 21, only a retardation layer may be used without using a linear polarizer.

A projector 21 usually attains color display utilizing light in the wave ranges for red (R), green (G) and blue (B) colors, the three primary colors. For example, assuming that light enters the projection screen 10-1 vertically to it, the projector 21 projects light in selective reflection wave ranges whose centers are between 430 nm and 460 nm, between 540 nm and 570 nm, and between 580 nm and 620 nm. For this reason, it is preferable that the projection screen 10-1 is made to selectively reflect only light in the wave ranges that correspond to the wave ranges of the imaging light projected from the projector 21. By so making the projection screen 10-1, it is possible to prevent reflection of environmental light, such as sunlight and light from lighting fixtures, in the visible region, not in the above-described wave ranges, thereby enhancing image contrast.

The projection system 20 usually comprises an illuminant 23 that is fixed to an illuminant-fixing member 25 such as the ceiling of a room, and this illuminant 23 illuminates a space in which the projection screen 10-1 is placed.

As shown in FIG. 18, in the case where the illuminant 23 is so positioned that the light 34 emitted from the illuminant 23 directly illuminates the projection screen 10-1, it is preferable to make the light 34 to be emitted from the illuminant 23 toward the projection screen 10-1 mainly contain a polarized-light component (e.g., left-handed circularly polarized light) that is different from the polarized-light component which the projection screen 10-1 selectively reflects. By so making the light 34, it is possible to effectively prevent the light 34 from being reflected from the polarized-light selective reflection layer 11-1 in the projection screen 10-1, thereby enhancing image contrast.

It is possible to control the state of polarization of the light 34 that is emitted from the illuminant 23, by providing, in the vicinity of the illuminant 23, a polarizer film 24 capable of transmitting left-handed circularly polarized light. An absorption circular polarizer or a polarized-light separator (reflection circular polarizer) may be used as the polarizer film 24. Examples of polarized-light separators useful herein include circularly-polarized-light separators using cholesteric liquid crystal layers, and linearly-polarized-light separators containing, on the exit side, retardation layers for converting linearly polarized light into circularly polarized light. These polarized-light separators are superior to absorption circular polarizers because they cause smaller loss of the amount of light than absorption circular polarizers do.

Figure 19:
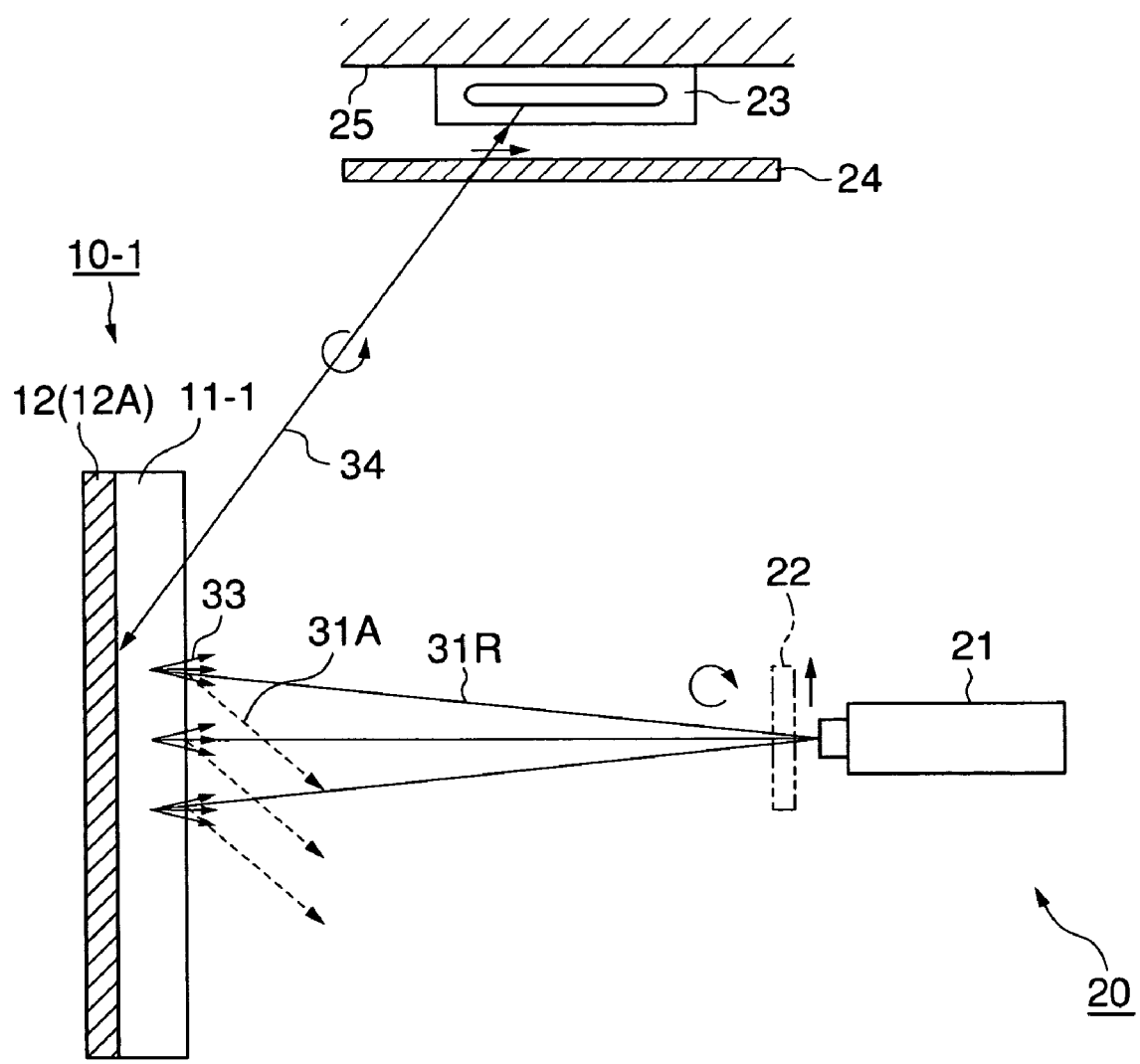
FIG. 19 is a diagrammatic view showing another projection system comprising the projection screen shown in FIG. 1A.

In the projection system 20 shown in FIG. 18, the light 34 emitted from the illuminant 23 directly illuminates the projection screen 10-1. The present invention is not limited to this, and also includes an embodiment in which the illuminant 23 is, as shown in FIG. 19, fixed on an illuminant-fixing member 26 other than the ceiling so that the light 35 emitted from the illuminant 23 indirectly illuminates, as light 35', the projection screen 10-1 via a reflector 27 such as the ceiling. In this case, the state of polarization of the circularly polarized light is reversed when the reflector 27 reflects the light. It is, therefore, preferable to make the light 35 to be emitted from the illuminant 23 toward the reflector 27 mainly contain a polarized-light component (e.g., right-handed circularly polarized light) that is identical with the polarized-light component which the projection screen 10-1 selectively reflects, by providing a polarizer film 24' or the like that transmits right-handed circularly polarized light, as in the case shown in FIG. 18. The polarizer film 24' may be the same as the above-described polarizer film 24. If such a polarizer film is used, the light 35' whose state of polarization has been reversed by the reflector 27 is to mainly contain a polarized-light component (e.g., left-handed circularly polarized light) that is different from the polarized-light component which the projection screen 10-1 selectively reflects. For this reason, it is possible to effectively prevent the light 35' from being reflected from the polarized-light selective reflection layer 11-1 in the projection screen 10-1, thereby enhancing image contrast.

In the projection system 20, the projector 21 is usually placed around the normal to the center portion of the projection screen 10-1, 10-2, 10-3, 10-4. The position of the projector 21 is not limited to this, and the projector 21 may also be, for example, attached to the ceiling of a room or placed on the floor of a room. In this case, that is, when the projector 21 and the projection screen 10-1, 10-2, 10-3, 10-4 are placed in a so-called offset manner, not the entire part but a limited part (e.g., the upper or lower half) of the observation-side surface of the polarized-light selective reflection layer 11-1 may be made to have the above-described optical properties.

EXAMPLES

A specific example of the above-described embodiments will now be given below.

Example

A first cholesteric liquid crystal solution having a selective reflection wave range with a center wavelength of 440 nm was prepared by dissolving, in cyclohexanone, a monomer-containing liquid crystal consisting of a main component that was an ultraviolet-curing, nematic liquid crystal (94.7% by weight) and a polymerizable chiral agent (5.3% by weight). A liquid crystal containing a compound represented by the above chemical formula (2-xi) was used as the nematic liquid crystal. A compound represented by the above chemical formula (5) was used as the polymerizable chiral agent. To the first cholesteric liquid crystal solution was added 5% by weight of a photopolymerization initiator available from Ciba Specialty Chemicals K.K., Japan.

By a bar coating method, the above-prepared first cholesteric liquid crystal solution was applied to a substrate, a 200 mm×200 mm acrylic sheet with a thickness of 3 mm.

This substrate was heated in an oven at 80° C. for 90 seconds, thereby conducting aligning treatment (drying treatment). Thus, a cholesteric liquid crystal layer containing no solvent was obtained.

Thereafter, 50 mW/cm$^2$ of ultraviolet light with a wavelength of 365 nm was applied to this cholesteric liquid crystal layer for 1 minute for curing, thereby obtaining a first partial selective reflection layer having a selective reflection wave range whose center wavelength was 440 nm.

Similarly, a second cholesteric liquid crystal solution was applied directly to the first partial selective reflection layer and then subjected to aligning treatment (drying treatment) and curing treatment. Thus, a second partial selective reflection layer having a selective reflection wave range with a center wavelength of 550 nm was obtained. The procedure used for preparing the second cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 550 nm.

Similarly, a third cholesteric liquid crystal solution was applied directly to the second partial selective reflection layer and then subjected to aligning treatment (drying treatment) and curing treatment. Thus, a third partial selective reflection layer having a selective reflection wave range with a center wavelength of 600 nm was obtained. The procedure used for preparing the third cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 600 nm.

Thus, there was obtained a projection screen comprising a polarized-light selective reflection layer composed of the first partial selective reflection layer capable of selectively reflecting light in the blue (B) color wave range (light in the selective reflection wave range with a center wavelength of 440 nm), the second partial selective reflection layer capable of selectively reflecting light in the green (G) color wave range (light in the selective reflection wave range with a center wavelength of 550 nm), and the third partial selective reflection layer capable of selectively reflecting light in the red (R) color wave range (light in the selective reflection wave range with a center wavelength of 600 nm), successively laminated in this order from the substrate side. The thickness of the first partial selective reflection layer was made 3 μm, that of the second partial selective reflection layer was made 4 μm, and that of the third partial selective reflection layer was made 5 μm. These partial selective reflection layers constituting the polarized-light selective reflection layer in the projection screen had cholesteric liquid crystalline structures that were not in the state of planar orientation.

A mold with a roughened molding surface was pressed onto the observation-side surface of the polarized-light selective reflection layer in the projection screen produced in the above-described manner, thereby obtaining a projection screen 1 in which the observation-side surface of the polarized-light selective reflection layer was roughened. Specifically, after thermally softening the cholesteric liquid crystal layer serving as the polarized-light selective reflection layer, the mold was pressed onto this softened layer; the polarized-light selective reflection layer was then cured, thereby fixing the roughness provided on the observation-side surface of the polarized-light selective reflection layer. The mold used in this step had a molding surface on which a plurality of grooves were continuously formed in such a manner that the ridges of the grooves were nearly parallel to one another, the cross section of each groove being angular (in the shape of a right-angled triangle). The base width of each groove was 0.1 mm, and the inclination of the inclined plane of each groove was 7 degrees.

Comparative Example

The procedure of the above Example was repeated, provided that the roughened part was not provided on the observation-side surface of the polarized-light selective reflection layer, thereby preparing a projection screen 2.

(Results of Evaluation)

The projection screen 1, 2 was set vertically to the floor. A projector was placed vertically to the projection screen 1, 2 (in parallel with the floor) at a point approximately 2.5 m distant from the projection screen 1, 2. A DLP projector was used as the projector, and a circular polarizer was attached to the exit aperture of the projector in order to convert the imaging light emitted from the projector into circularly polarized light. A fluorescent lamp (emitting unpolarized light) was used to illuminate the room in which the projector and the projection screen 1, 2 were placed. The fluorescent lamp was fixed above the projection screen 1, 2 so that the light from the fluorescent lamp entered the projection screen 1, 2 from above. The projection screen 1 was placed in such a manner that the inclined planes for controlling the direction of interfacial direction of imaging light, contained in the roughened part formed on the observation-side surface of the polarized-light selective reflection layer, faced the floor of the room.

Imaging light (a patterned image of red (R), green (G) and blue (B) colors) was projected on the projection screen 1, 2 from the projector, and the projector side surface of the screen on which the image was projected was observed from the front.

When the image on the projection screen 2 was viewed, mirroring of the light source (the projector) was observed in a portion slightly below the center portion of the screen. In this portion of the screen, the light source was mirrored excessively brightly, so that it was impossible to recognize the image.

On the other hand, when the image on the projection screen 1 was viewed, no substantial mirroring of the light source was observed, and it was possible to clearly recognize the image. Further, mirroring of the light source was not observed when the screen was viewed from the front but observed when the screen was obliquely viewed from the floor side.

What is claimed is:

1. A projection screen for displaying an image by reflecting imaging light that is projected from an observation side, the projection screen comprising:
a polarized-light selective reflection layer that selectively diffuse-reflects a specific polarized-light component, the polarized-light selective reflection layer having, on at least part of an observation-side surface thereof, a roughened part for controlling a direction of interfacial reflection of imaging light that is projected on the polarized-light selective reflection layer,
wherein the surface of the roughened part of the polarized-light selective reflection layer is in a shape so determined that imaging light reflected from the surface of the roughened part by interfacial reflection emerges in a direction different from a main direction in which the imaging light diffuse-reflected from the polarized-light selective reflection layer emerges.

2. The projection screen according to claim 1, wherein the roughened part of the polarized-light selective reflection layer has inclined planes, a direction of a normal to the inclined planes being different from a direction of a normal to the projection screen.

3. The projection screen according to claim 1, wherein the roughened part of the polarized-light selective reflection layer has a serrate cross section or is composed of pyramidal units.

4. The projection screen according to claim 1, wherein the roughened part of the polarized-light selective reflection layer has a plurality of inclined planes disposed regularly, a direction of a normal to the inclined planes being different from a direction of a normal to the projection screen, and the inclined planes have irregularly roughened surfaces.

5. The projection screen according to claim 1, wherein the roughened part of the polarized-light selective reflection layer has a plurality of first planes, a direction of a normal to each of the first planes being different from a direction of a normal to the projection screen, and a plurality of second planes formed so as to connect each neighboring two of the first planes; the first planes comprise inclined planes that are inclined so that imaging light reflected from the first planes of the roughened part by interfacial reflection emerges in a direction different from a main direction in which the imaging light diffuse-reflected from the polarized-light selective reflection layer emerges; and the first planes have dispersion portions that disperse a direction of light that is reflected at each of the first planes, or a direction of light that emerges from each of the first planes after the light, which enters through each of the second planes, is repeatedly reflected inside the roughened part.

6. The projection screen according to claim 5, wherein the first planes of the roughened part comprise a plurality of the inclined planes having different inclined angles.

7. The projection screen according to claim 5, wherein the first planes of the roughened part comprise a plurality of the inclined planes having different pitches.

8. The projection screen according to claim 5, wherein the second planes have scattering portions that scatter light passing through each of the second planes.

9. The projection screen according to claim 1, wherein the roughened part of the polarized-light selective reflection layer has a plurality of first planes, a direction of a normal to each of the first planes being different from a direction of a normal to the projection screen, and a plurality of second planes formed so as to connect each neighboring two of the first planes; the first planes comprise inclined planes that are inclined so that imaging light reflected from the first planes of the roughened part by interfacial reflection emerges in a direction different from a main direction in which the imaging light diffuse-reflected from the polarized-light selective reflection layer emerges; and the second planes have scattering portions that scatter light passing through each of the second planes.

10. The projection screen according to claim 1, wherein the specific polarized-light component is right- or left-handed circularly polarized light.

11. The projection screen according to claim 1, wherein the specific polarized-light component is linearly polarized light of one vibration direction.

12. The projection screen according to claim 1, wherein the polarized-light selective reflection layer comprises a polarized-light selective reflection layer body that reflects the specific polarized-light component, and a diffusing element that diffuses light that is reflected from the polarized-light selective reflection layer body.

13. The projection screen according to claim 1, wherein the polarized-light selective reflection layer itself has diffusing properties.

14. The projection screen according to claim 13, wherein the polarized-light selective reflection layer has a cholesteric liquid crystalline structure, and, owing to structural non-uniformity in the cholesteric liquid crystalline structure, diffuses the specific polarized-light component.

15. The projection screen according to claim 14, wherein the cholesteric liquid crystalline structure contains a plurality of helical structure parts whose helical axes extend in different directions.

16. The projection screen according to claim 15, wherein the roughened part of the polarized-light selective reflection layer has inclined planes, a direction of a normal to the inclined planes being different from a direction of a normal to the projection screen, and at least some of the helical structure parts have helical axes extending in the directions that are different from the direction of the normal to the inclined planes.

17. The projection screen according to claim 1, further comprising a substrate that supports the polarized-light selective reflection layer.

18. The projection screen according to claim 17, wherein the substrate is an absorptive substrate comprising a light-absorbing layer adapted to absorb light in a visible region.

19. The projection screen according to claim 17, wherein the substrate is a transparent substrate adapted to transmit at least part of light in a visible region.

20. The projection screen according to claim 1, wherein the polarized-light selective reflection layer comprises at least two partial selective reflection layers that are laminated to each other.

21. The projection screen according to claim 20, wherein an intermediate layer having barrier properties is provided between each neighboring two of the partial selective reflection layers.

22. The projection screen according to claim 20, wherein an intermediate layer having adherent properties is provided between each neighboring two of the partial selective reflection layers.

23. The projection screen according to claim 1, further comprising a functional layer containing at least one layer selected from a group consisting of a hard coat layer, an anti-reflection layer, an ultraviolet-light-absorbing layer and an antistatic layer.

24. A projection system comprising:
a projection screen according to claim 1; and
a projector that projects imaging light on the projection screen.

* * * * *